(12) United States Patent
Teranuma et al.

(10) Patent No.: US 6,980,008 B2
(45) Date of Patent: Dec. 27, 2005

(54) UNEVEN PATTERN DETECTOR AND UNEVEN PATTERN DETECTING METHOD

(75) Inventors: Osamu Teranuma, Tenri (JP); Yoshihiro Izumi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 523 days.

(21) Appl. No.: 10/190,801

(22) Filed: Jul. 8, 2002

(65) Prior Publication Data

US 2003/0016024 A1 Jan. 23, 2003

(30) Foreign Application Priority Data

Jul. 12, 2001 (JP) ........................................ 2001-211492
Mar. 25, 2002 (JP) ........................................ 2002-084313

(51) Int. Cl.$^7$ ............................................. G01R 27/26
(52) U.S. Cl. ....................................................... 324/663
(58) Field of Search ................................ 324/663, 662, 324/661, 658, 671

(56) References Cited

U.S. PATENT DOCUMENTS

| | | | | |
|---|---|---|---|---|
| 4,353,056 A | * | 10/1982 | Tsikos ........................ | 382/124 |
| 5,325,442 A | * | 6/1994 | Knapp ........................ | 382/124 |
| 5,973,623 A | * | 10/1999 | Gupta et al. .................. | 341/33 |
| 6,011,859 A | * | 1/2000 | Kalnitsky et al. ........... | 382/124 |
| 6,028,773 A | * | 2/2000 | Hundt ........................ | 361/760 |
| 2003/0183019 A1 | * | 10/2003 | Chae ...................... | 73/862.624 |

FOREIGN PATENT DOCUMENTS

| | | |
|---|---|---|
| EP | 0457398 A2 | 11/1991 |
| JP | 2000097690 A * 4/2000 | ........... G01B/21/20 |
| JP | 2000-213908 | 8/2000 |

OTHER PUBLICATIONS

Solid–State Circuits Conference, 1997. Digest of Technical Papers. 43rd ISSCC., 1997 IEEE International, pp. 200–201 and 456.*

U.S. Appl. No. 10/087,998, filed Mar. 5, 2002, Y. Izumi et al.

* cited by examiner

*Primary Examiner*—Charles H. Nolan
(74) *Attorney, Agent, or Firm*—David G. Conlin; Steven M. Jensen; Edwards & Angell, LLP

(57) ABSTRACT

An uneven pattern detector has a structure wherein (a) detecting elements, each being provided with a TFT which is a switching element and a detecting electrode, are arranged in a matrix manner, and (b) a CSA connected to each data line detects charged or discharged electric charges at the respective detecting elements on respective rows sequentially selected by a gate line, whereby a capacitance (a coupled capacitance of Cf and Cx) reflecting fingerprint unevenness on a finger as a detection object can be detected. In the uneven pattern detector, each of the detecting elements is provided with an auxiliary capacitor electrode located so as to face the detecting electrode. This forms an auxiliary capacitor Cs between the auxiliary capacitor electrode and the detecting electrode. Further, a positive-phase input terminal of an operational amplifier of the CSA is connected with the auxiliary capacitor electrode so as to hold the positive-phase input terminal of the operational amplifier of the CSA and the auxiliary capacitor electrode at an identical potential. As a result, the electric charges can be detected by the CSA without being affected by the auxiliary capacitor Cs.

23 Claims, 10 Drawing Sheets

UNEVEN PATTERN DETECTOR AND UNEVEN PATTERN DETECTING METHOD

FIELD OF THE INVENTION

The present invention relates to an uneven pattern detector that electrically reads unevenness in a surface shape of a detection object as a capacitance difference, and to a fingerprint detector, for example, which detects fingerprints based on the capacitance difference due to unevenness on a finger surface.

BACKGROUND OF THE INVENTION

A technique for detecting an uneven pattern on a surface of an object is used for detecting fingerprints.

Conventionally, following three methods are mainly known as a method for detecting fingerprints. A first method is a capacitance method in which a capacitance is formed between a predetermined electrode in a detecting device and a finger surface by placing the finger on the detecting device, and fingerprints are detected based on a capacitance difference due to unevenness on the finger surface constituting the fingerprints (hereinafter referred to as "fingerprint unevenness") as a potential difference or a current difference. A second method is an optical method in which the detecting device irradiates light onto the finger surface, and fingerprints are detected based on a difference in light reflecting states due to the fingerprint unevenness. A third method is a pressure method in which the finger is pressed on the detecting device, and fingerprints are detected based on a difference in pressure due to the fingerprint unevenness, as a difference in electrical contact and non-contact or the capacitance difference. Among conventional methods including the above-described three methods, the capacitance method is simpler in terms of a structure in comparison to the other methods, and a section can be formed thinner, where the finger as a detection object is placed and the capacitance due to the fingerprint unevenness is detected. For this beneficial feature, the capacitance method is expected to be adopted in a portable terminal in the future.

As for the capacitance method, Publication No. EP0457398A2 (published on Nov. 21, 1991) and Japanese Unexamined Patent Application Tokukai No. 2000-213908 (published on Aug. 4, 2000), for example, disclose a device and a method for detecting the fingerprints adopting the capacitance method. A conventional uneven pattern detector is explained below, referring to a fingerprint detecting device disclosed in the Publication No. EP0457398A2, for example.

FIG. 10 is a partial sectional view of a fingerprint detecting device, which is the conventional uneven pattern detector. A basic structure of this fingerprint detecting device is prepared as follows. Formed on a substrate 101 is a circuit for detecting electric charges, which is composed of detecting electrodes 102 positioned in a matrix manner, address lines 103 and the like. Further, an insulation film 104 is formed so as to cover a top surface of the circuit. When a finger 105 is placed on the top surface of the detecting device, a distance d between a finger surface 106 and the insulation film 104 differs according to the fingerprint unevenness on the finger surface. Therefore, a capacitance 107 formed between the detecting electrode 102 and the finger depends on the distance d, and differs according to the fingerprint unevenness on the finger surface. The detecting electrode 102 receives a constant potential via the detecting circuit by way of switch elements (not shown) controlled by drive lines (not shown). At this point, the capacitance 107 charges or discharges in accordance with the potential of the detecting electrode 102. Then, by reading out charged or discharged electric charges from the detecting circuit, information is obtained indicating a pattern of the fingerprint unevenness.

In the foregoing conventional fingerprint detecting device, the fingerprint unevenness is reflected on changes in the charged electric charges of the capacitance 107, i.e. changes in the potential of the detecting electrode 102. Therefore, the potential of the detecting electrode 102 is desirably maintained at a value as constant as possible during a state before the electric charges are read out by switching ON the switch element, namely while the switch element is OFF.

On the other hand, Tokukai No. 2000-213908 discloses a capacitance detecting device, which is an uneven pattern detector that can be used for detecting the fingerprints, and which has a similar arrangement as the above-described fingerprint detecting device (the same reference symbols are assigned to the corresponding constituent members (see FIG. 10)). In the capacitance detecting device, a silicon substrate 101 is used, and the silicone substrate 101 is grounded. Therefore, a parasitic capacitance is formed between the substrate 101 and the detecting electrode 102. Because of this, the potential of the detecting electrode 102 is fixed by the capacitance 107 and the parasitic capacitance thereof, so that the potential of the detecting electrode 102 is stabilized.

However, the potential is stabilized because a substrate composed of a conductor (or a semiconductor) such as the silicone substrate is used for the supporting substrate 101. When an insulator such as glass is used for the supporting substrate, the supporting substrate 101 cannot be grounded. As a result, the potential of the detecting electrode 102 cannot be stabilized.

Further, when the parasitic capacitance as described above exists, charged electric charges according to the parasitic capacitance are added as an offset component to the charged electric charges according to the capacitance 107, which are to be detected. As long as the offset component is constant, it is possible to detect fingerprints by obtaining a difference in detected electric charges in accordance with the pattern of the fingerprint unevenness. However, this offset component narrows a range of the detected value of the charged electric charges, namely a dynamic range of the capacitance detecting device. Therefore, it is desirable that the offset component does not exist, or the offset component, if any, is not added to the detected electric charges.

In response, Tokukai No. 2000-213908 discloses a capacitance detecting device which prevents the charged electric charges according to the parasitic capacitance from being added as the offset component to the charged electric charges according to the capacitance 107, which are to be detected. In this capacitance detecting device, dummy electrodes are provided per each row of the detecting electrodes 102 for forming a cancel capacitance having a similar amount of the parasitic capacitance. However, when the dummy electrodes are provided, an arrangement of the detecting device becomes complicated. Further, the parasitic capacitance of each of the detecting electrodes 102 essentially differs respectively to some extent. Thus, when a constant area of the dummy electrode is provided with respect to the irregular parasitic capacitance so as to form the cancel capacitance, a certain amount of the offset component inevitably remains at each detecting electrode, thereby complicating a procedure for compensating the remaining portions.

SUMMARY OF THE INVENTION

An object of the present invention is to provide a device for detecting an uneven pattern such as fingerprints more easily and surely and a detecting method thereof.

In order to achieve the foregoing object, an uneven pattern detector of the present invention, for detecting an uneven pattern on a detection object placed on a detecting surface, is arranged so as to include (a) a drive circuit, (b) a detecting circuit, (c) a plurality of drive signal lines connected to the drive circuit, (d) a plurality of detecting signal lines connected to the detecting circuit, arranged so as to cross the plurality of drive signal lines respectively, and (e) a plurality of detecting elements respectively corresponding to intersections of the plurality of drive signal lines and the plurality of detecting signal lines, wherein each of the respective detecting elements includes (1) a switching element switched ON and OFF respectively in response to an active signal and a non-active signal applied to a corresponding drive signal line which is a drive signal line passing through a corresponding intersection, (2) a detecting electrode connected via the switching element to a corresponding detecting signal line which is a detecting signal line passing through a corresponding intersection, and (3) an auxiliary capacitor electrode provided so as to form a predetermined capacitance with the detecting electrode, wherein the drive circuit applies the active signal and the non-active signal to the corresponding drive signal line so as to switch the switching element ON and OFF, the detecting circuit supplies a predetermined potential to the corresponding detecting signal line, and detects a resulting capacitance formed between the detection object and each of the detecting electrodes according to the uneven pattern, based on electric charges transferred between the detecting circuit and each of the detecting electrodes via the corresponding detecting signal line and the switching element.

With this arrangement, when a constant potential is supplied to the auxiliary capacitor electrode, a potential is fixed at both ends of a coupled capacitance in which (a) the capacitance (target capacitance) formed between the detection object and the detecting electrode and (b) the capacitance (auxiliary capacitance) formed between the detecting electrode and the auxiliary capacitor electrode are coupled in series. This stabilizes the potential of the detecting electrode even when the switching element is OFF. This reduces an error in the charged electric charges according to the capacitance between the detection object and the detecting electrode. Because of this, it is possible to detect the uneven pattern on the detection object more accurately.

Moreover, a detecting method of the present invention, for detecting an uneven pattern on a detection object by the uneven pattern detector, is arranged so as to have the steps of (1) switching ON the switching element, and supplying an identical potential with a potential of the detection object to the corresponding detecting signal line and the auxiliary capacitor electrode while the switching element is ON, (2) switching OFF the switching element, and supplying a different potential from the potential of the detection object to the corresponding detecting signal line and the auxiliary capacitor electrode while the switching element is OFF, and (3) switching ON the switching element, and detecting electric charges transferred between the detecting circuit and the detecting electrode via the corresponding detecting signal line while the switching element is ON, wherein said steps (1) through (3) are carried out in this order, and a capacitance formed between the detection object and each of the detecting electrodes according to the uneven pattern, is detected based on the electric charges detected in the step (3).

With this method, the electric charges are determined by the capacitance (target capacitance) which is formed between the detection object and each of the detecting electrodes. Then, the electric charges are transferred between the detecting electrode and the detecting circuit, and the transferred electric charges are detected. This means that the capacitance reflecting the uneven pattern on the detection object is detected.

For a fuller understanding of the nature and advantages of the invention, reference should be made to the ensuing detailed description taken in conjunction with the accompanying drawings.

DESCRIPTION OF THE EMBODIMENTS

Referring to attached figures, embodiments of the present invention are explained below.

First Embodiment 1.1 Overall Arrangement

Figure 1:
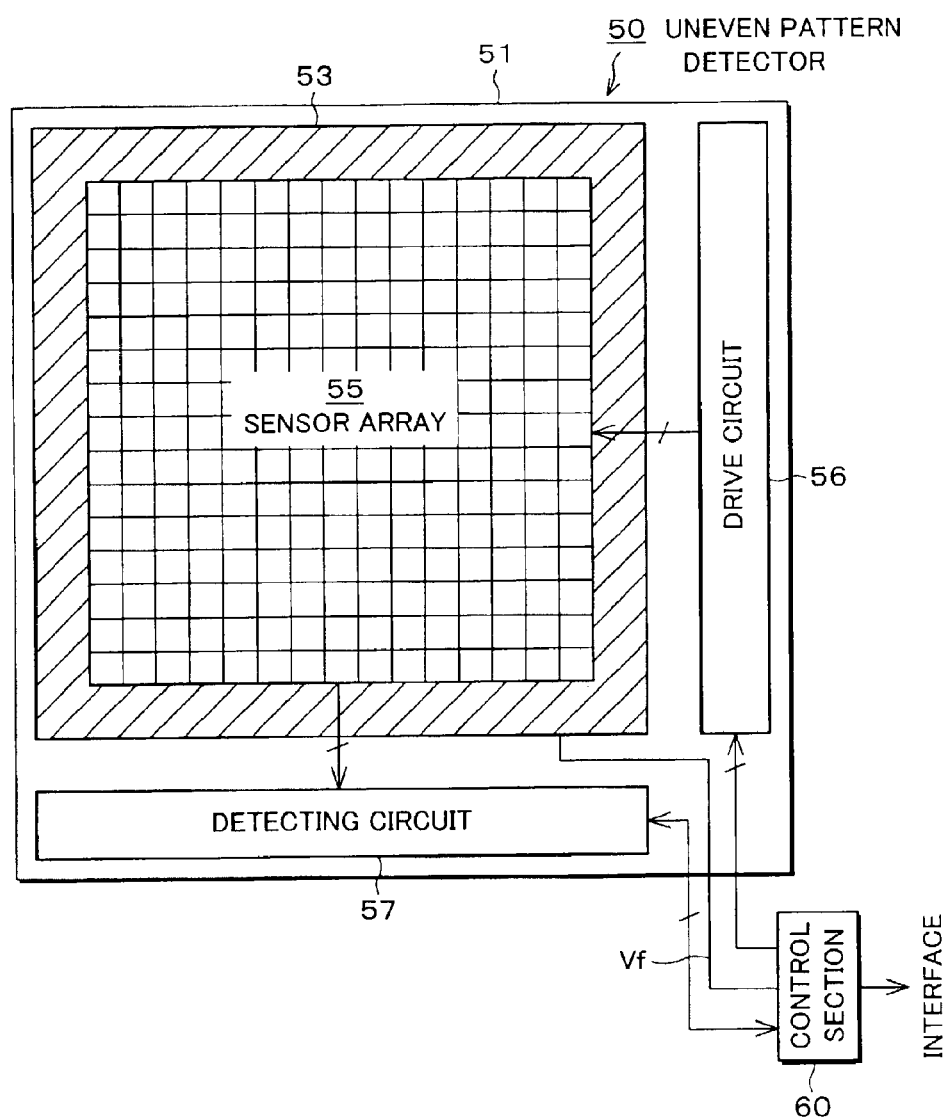
FIG. 1 is a block diagram showing an arrangement of an uneven pattern detecting device in accordance with a first embodiment of the present invention.

FIG. 1 is a block diagram showing an arrangement of an uneven pattern detecting device using an uneven pattern detector in accordance with a first embodiment of the present invention (hereinafter referred to as an "uneven pattern detecting device in accordance with the present embodiment"). The uneven pattern detecting device is provided for detecting fingerprints in the form of an uneven pattern on a surface of a human finger. The uneven pattern detecting device is composed of an uneven pattern detector 50 and a control section (sequence control means) 60. The uneven pattern detector 50 is prepared by partially modifying an active matrix substrate used in a liquid crystal display device for detecting a surface shape of an object. The uneven pattern detector 50 is provided with a sensor array 55, a frame-shaped electrode pad 53, a drive circuit 56, and a detecting circuit 57 on an insulation substrate 51 composed of glass.

Figure 2:
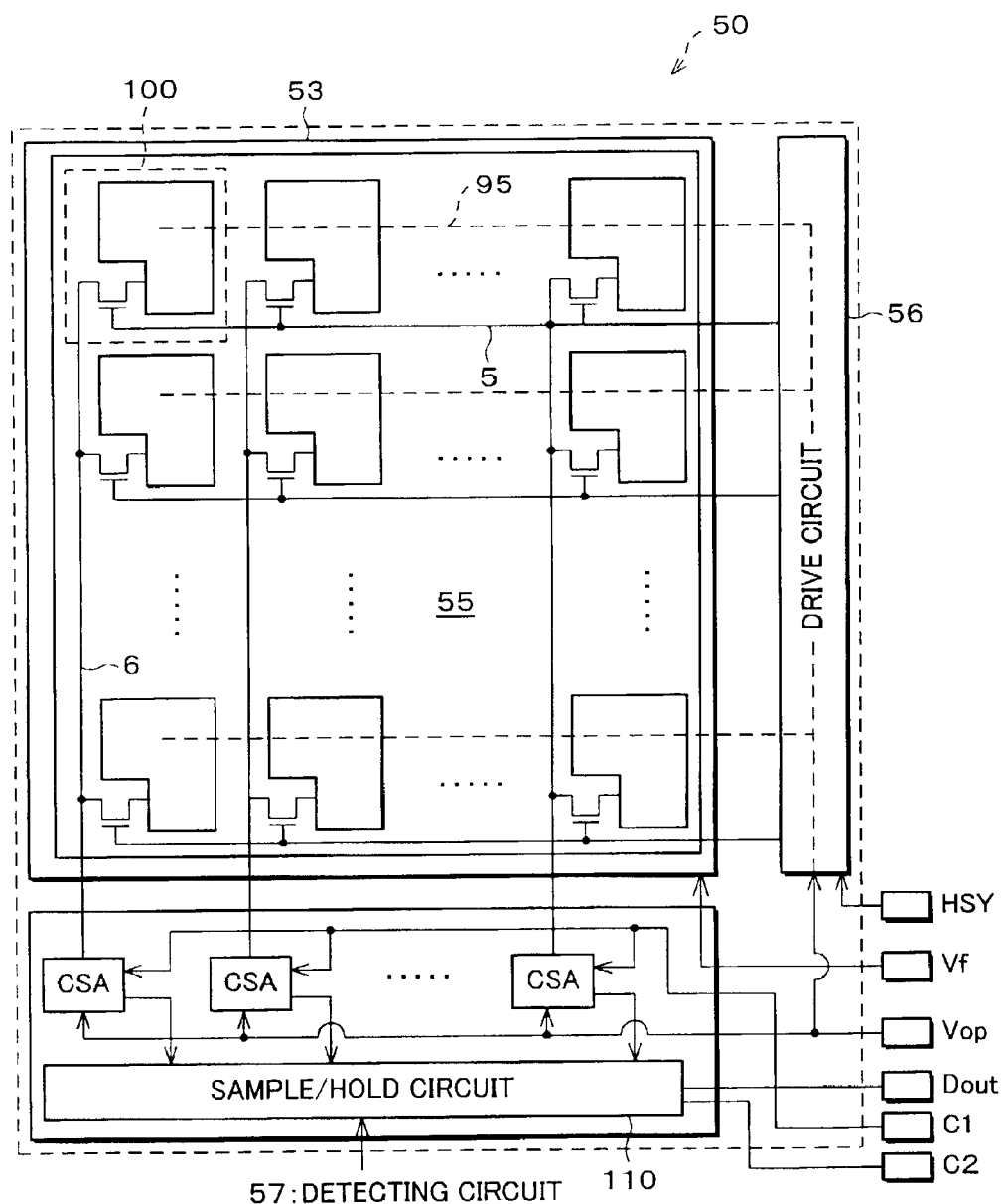
FIG. 2 is a block diagram showing a schematic arrangement of an uneven pattern detector in accordance with the first embodiment.

FIG. 2 is a block diagram showing a schematic arrangement of the uneven pattern detector 50. As shown in this Figure, on the sensor array 55, detecting elements 100, which correspond to pixels in the display active-matrix, are arranged in a matrix manner, and gate lines 5 as a plurality of drive signal lines are formed in a row direction whereas data lines 6 as a plurality of detecting signal lines are formed in a column direction. In other words, on the sensor array 55, the detecting elements 100 are laid in a tiled manner, and each of the detecting elements 100 are provided at respective intersections of the plurality of gate lines 5 and the plurality of data lines 6. Note that, the detecting element 100 has a 50 μm square shape, for example, whereas the sensor array 55 has a 15 mm square shape, for example, and is composed of 300×300 of the detecting elements. In this case, resolution for reading the uneven pattern is approximately 500 dpi.

The frame-shaped electrode pad (potential application means) 53 is an electrode pad for grounding a finger or supplying a predetermined potential to the finger when the finger as a detection object is placed on the sensor array 55. The frame-shaped electrode pad 53 is placed so as to surround the sensor array 55.

The drive circuit 56 corresponds to a scanning-side drive circuit in a display panel. In response to a scanning signal HSY supplied from the control section 60, the drive circuit 56 applies a drive signal (an active signal or a non-active signal) to the plurality of the gate lines 5 so as to selectively operate the detecting elements in respective columns of the sensor array 55.

The detecting circuit 57 is provided with CSAs (Charge Sensitive Amplifier) as electric charge detecting means connected to the respective data lines 6, and a sample/hold circuit (detected data storing circuit) 110. In response to an input signal Vop received from the control section 60, each of the CSAs (a) supplies the predetermined potential to the respective data lines 6 to which the respective CSAs are connected, (b) detects electric charges transferred between the detecting circuit 57 and the detecting elements 100 via the data line 6, and (c) outputs a signal indicating the electric charges. The sample/hold circuit 110 samples and holds the output signal from the respective CSAs and then serially outputs the output signals as the detected data Dout. Note that, operations of the respective CSAs and the sample/hold circuit 110 are controlled by control signals C1 and C2 supplied from the control section.

The control section 60 supplies a predetermined potential Vf (in the present embodiment, Vf=0; namely grounded) to the frame-shaped electrode pad 53, and supplies the scanning signal HSY, the input signal Vop of the CSA, and the control signals C1 and C2 so as to control the drive circuit 56 and the detecting circuit 57. The control section 60 also generates fingerprint data, which indicate the fingerprints to be detected, based on the detected data Dout sent from the detecting circuit 57, and temporarily stores the fingerprint data. From the control section 60, the fingerprint data are transferred via a predetermined interface circuit to a fingerprint checking system (not shown), an authentication system based on the fingerprints, and the like.

1.2 A detailed arrangement of the uneven pattern detector

Figure 3:
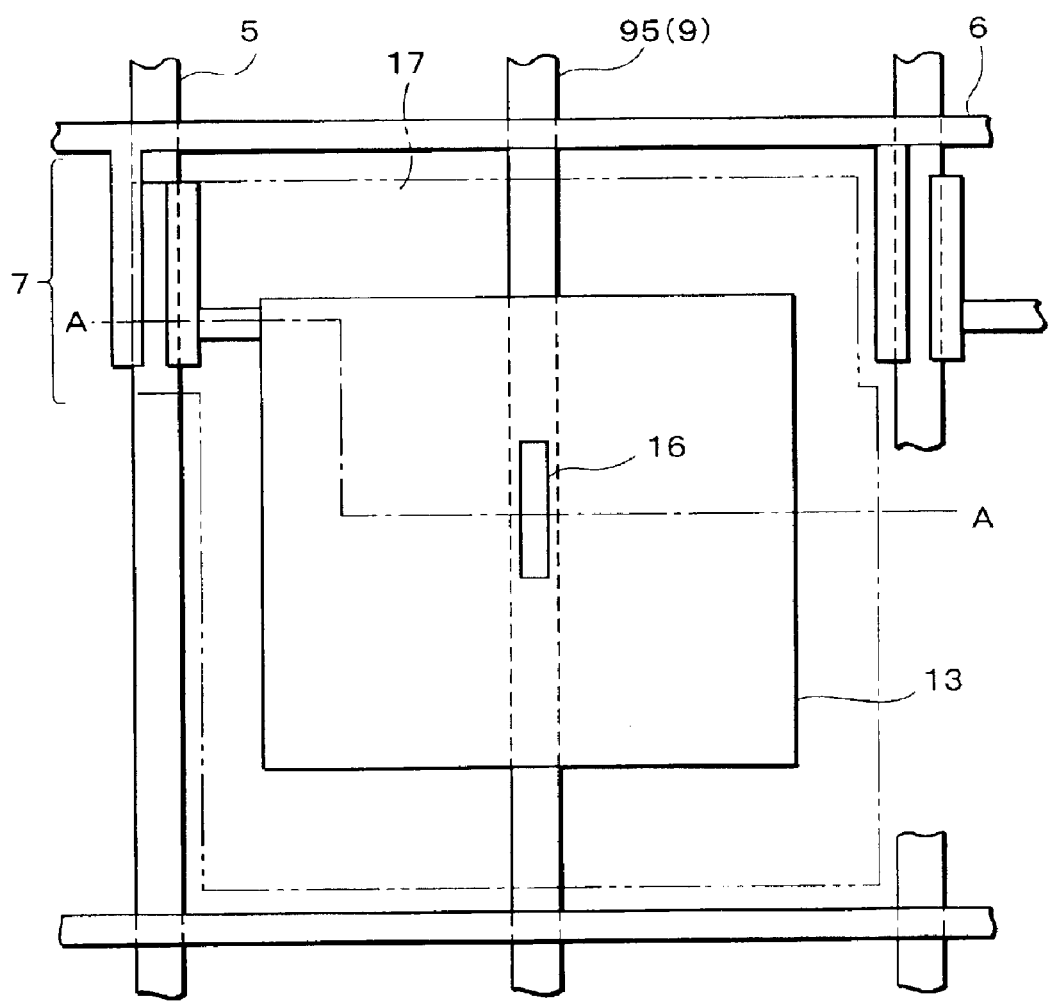
FIG. 3 is a perspective plan view showing an arrangement of a detecting element in the uneven pattern detector in the first embodiment.
Figure 4:
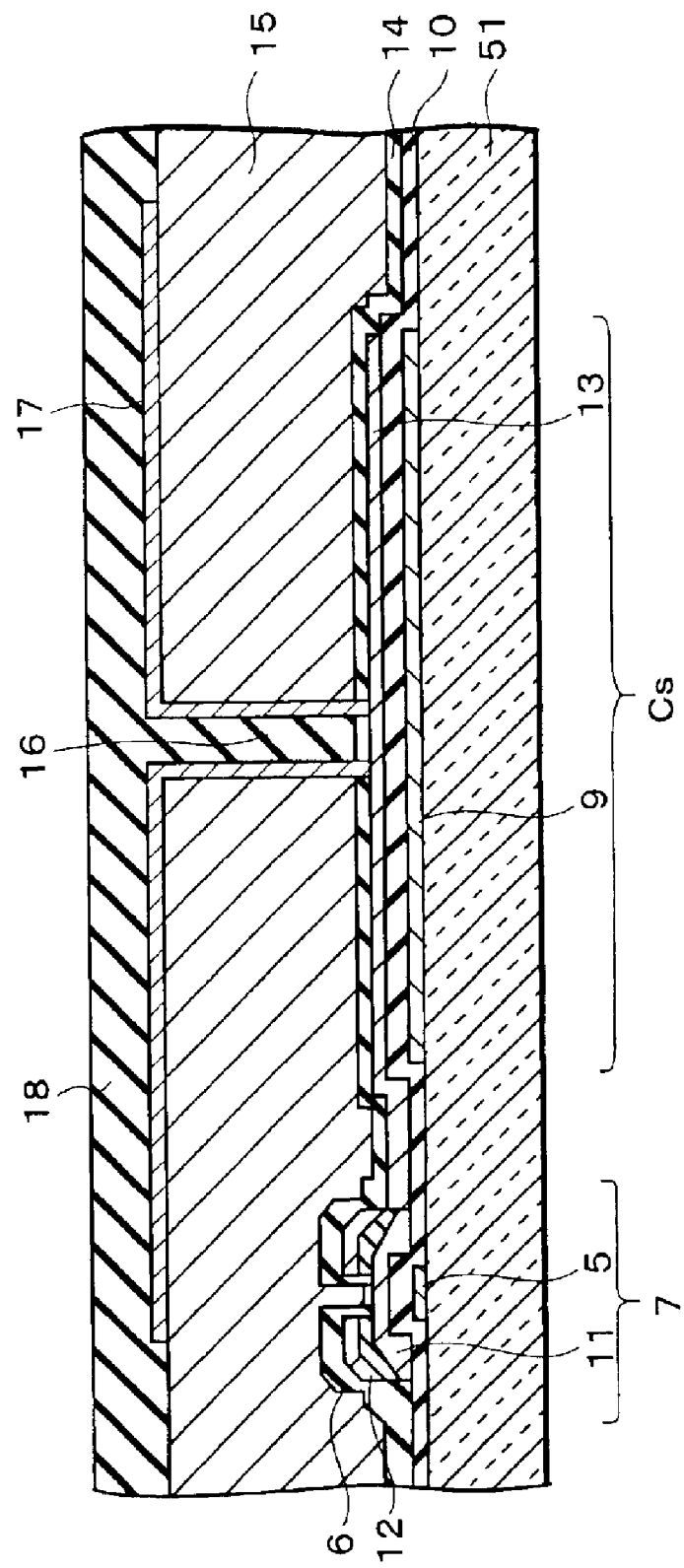
FIG. 4 is a sectional view taken on line A—A of FIG. 3.

FIG. 3 is a perspective plan view showing an arrangement of a detecting element in the sensor array 55 of the uneven pattern detector 50, whereas FIG. 4 is a cross-sectional view taken on line A—A of FIG. 3. Referring to FIGS. 3 and 4, a detailed arrangement of the uneven pattern detector 50 in accordance with the present embodiment is explained below.

In the uneven pattern detector 50, on the insulation substrate 51 composed of glass, (a) electrode wiring corresponding to the plurality of (for example, 300 lines of) gate lines 5, (b) electrode wiring corresponding to the plurality of (for example, 300 lines of) data lines 6, arranged so as to cross the gate lines 5 respectively, and (c) the plurality of (for example, 300×300 of) detecting elements 100 respectively corresponding to the intersections of the gate lines 5 and the data lines 6 (see FIG. 2). Each of the detecting elements 100 includes (a) a thin film transistor (hereinafter referred to as a "TFT (Thin Film Transistor)") 7 as a switching element, (b) a detecting electrode composed of a lower layer detecting electrode (an electrode for an auxiliary capacitor electrode) 13 and an upper layer detecting electrode (an electrode for a detection object) 17, and (c) an auxiliary capacitor electrode 9 for forming an auxiliary capacitor Cs with the lower layer detecting electrode 13. A detailed arrangement of a basic section of the uneven pattern detector is explained below, along with its manufacturing method.

In the present embodiment, a non-alkali glass substrate is used as the insulation substrate 51 (for example, Corning #7059 or #1737). On the glass substrate 51, a wiring electrode corresponding to the gate line 5 (hereinafter referred to as a "gate line electrode", and indicated by a reference numeral "5") and the auxiliary capacitor electrode 9 are provided. The gate line electrode 5 and the auxiliary capacitor electrode 9 are composed of a metal film such as Ta (tantalum) or Al (Aluminum). The gate line electrode 5 and the auxiliary capacitor electrode 9 are formed in such a manner that the metal film such as Ta or Al is deposited into a film having a thickness of approximately 3000 Å by a sputtering evaporation method and is patterned into a desired shape. At this point, the auxiliary capacitor electrode 9 is desirably placed on an opposite side of the detecting surface with respect to the detecting electrode and is desirably formed in a size enough for covering almost an entire detecting electrode, in order to electrostatically shield the detecting electrode from below. The detecting electrode is composed of the upper layer detecting electrode 17 and the lower layer detecting electrode 13.

In the present embodiment, an area of the auxiliary capacitor electrode 9 is formed substantially identical with an area of the lower layer detecting electrode 13. Note that, the auxiliary capacitor electrode 9 includes a wiring electrode (hereinafter referred to as a "Cs line", and indicated by a reference numeral "9S") for connecting a section of the auxiliary capacitor electrode 9 in an adjacent detecting element in a direction of the gate line. With this structure, it is possible to supply a desired potential from the drive circuit 56 to the section of the auxiliary capacitor electrode 9 in the respective detecting elements which are provided along respective gate lines.

A gate insulation film 10 is provided on almost an entire surface of the glass substrate 51 so as to cover the gate line electrode 5 and the auxiliary capacitor electrode 9. The gate insulation film 10 is formed in such a manner that SiNx (silicone nitride) or SiOx (silicone oxide) is deposited into a film having a thickness of 3500 Å by using a CVD method (Chemical Vapor Deposition method). The gate insulation film 10 is also a constituent member for forming the auxiliary capacitor Cs along with the auxiliary capacitor electrode 9. Note that, not only SiNx or SiOx, but also an anodized oxide film in which the gate line electrode 5 and the auxiliary capacitor electrode 9 are anodized, may be used as the gate insulation film 10.

Above the gate line electrode 5 formed via the gate insulation film 10 are (a) an amorphous silicone film (hereinafter referred to as an "a-Si film") (i layer) 11, which forms a channel section of the TFT 7, and (b) an a-Si film (n+ layer) 12, which contacts a wiring electrode corresponding to the data line 6 (hereinafter referred to as a "data line electrode") and the lower layer detecting electrode 13 are provided. The a-Si film (i layer) 11 and the a-Si film (n+ layer) 12 are formed in such a manner that the a-Si films are respectively deposited into a film having a thickness of approximately 1000 Å and 400 Å, respectively, by the CVD method, and are respectively patterned into a desired shape.

On the a-Si film (n+ layer) 12, (a) the data line electrode (also indicated by a reference numeral "6") composed of the metal film such as Ta or Al and (b) the lower layer detecting electrode 13 are provided. The lower layer detecting electrode 13 is also a constituent member for forming the auxiliary capacitor Cs. The data line electrode 6 and the lower layer detecting electrode 13 are formed in such a manner that the metal film such as Ta or Al is deposited into a film having a thickness of approximately 3000 Å by the sputtering evaporation method and is patterned into a desired shape.

A first insulation protection film 14 is provided so as to cover almost the entire surface of the glass substrate 51 on which the TFT 7, the auxiliary capacitor Cs and the like are formed as described above. The first insulation protection film 14 is formed in a following manner; SiNx is formed into a film having a thickness of approximately 3000 Å by the CVD method, and the SiNx film is eliminated only at a predetermined portion in an upper section of the lower layer detecting electrode 13 (corresponding to a drain electrode of the TFT 7), where a contact hole 16 is formed in a subsequent step.

Further, a second insulation protection film 15 having a thickness of approximately 3 μm is formed so as to cover almost an entire surface of the first insulation protection film 14. The second insulation protection film 15 is formed in such a manner that an organic insulation film such as photosensitive acrylic resin is formed into a film, for example. Then, the contact hole 16 is formed at the predetermined portion in the second insulation protection film 15 by a patterning method using a photolithography technique.

Further, the upper layer detecting electrode 17 is provided on the second insulation protection film 15. The upper layer detecting electrode 17 is formed in such a manner that the metal film such as Ta or Al is formed into a film having a thickness of approximately 2000 Å by the sputtering evaporation method and is patterned into a desired shape. Here, the upper layer detecting electrode 17 and the lower layer detecting electrode 13 are short-circuited via the contact hole 16 provided in the second insulation protection film 15.

Further, a capacitor forming layer 18 is provided on the upper layer detecting electrode 17. An upper surface of the capacitor forming layer 18 serves as a detecting surface on which a finger as a detection object is to be placed. The capacitor forming layer 18 is formed in such a manner that $Ta_2O_5$ (tantalum pentoxide) is formed into a film having a thickness of approximately 4000 Å by the sputtering evaporation method.

The basic structure of the uneven pattern detecting device 50 in accordance with the present embodiment is realized as described above.

Incidentally, the material for the capacitor forming layer 18 is not limited to $Ta_2O_5$ (tantalum pentoxide) adopted in the present embodiment, and various types of inorganic or organic insulation materials (dielectric materials) can be used for forming the capacitor forming layer 18. For example, SiNx (silicone nitride), $SiO_2$ (silicone oxide), acrylic resin, PI (polyimide) resin, etc. can be used for the capacitor forming layer 18. Further, in the present embodiment, the TFT having an inverse stagger structure using a-Si (amorphous silicone) is used as the TFT 7, but the structure and the material of the TFT 7 are not limited to those adopted in the present embodiment. The TFT 7 using p-Si (polycrystalline silicone), or the TFT 7 of a stagger structure may be adopted. Further, in the present embodiment, the glass substrate is used as the insulation substrate 51 on which various types of wiring and the like are formed, but not limited to this. Plastic and the like can be used as the material of the insulation substrate 51. Further, in the present embodiment, the area of the auxiliary capacitor electrode 9 is substantially identical with the area of the lower layer detecting electrode 13, but the area of the auxiliary capacitor electrode 9 may be larger than the area of the lower layer detecting electrode 13, in view of an electrostatic screening effect of the auxiliary capacitor electrode 9.

1.3 An Uneven Pattern Detecting Method

Next, explained is a detecting method in which the uneven pattern detecting device as arranged above detects the uneven pattern such as the fingerprints. In the present detecting method, under control of the control section 60, the drive circuit 56 sequentially selects the plurality of gate lines 5 in a cycle of a predetermined one frame period, and the detecting circuit 57 supplies the predetermined potential via the respective data lines to the detecting elements 100 which are provided along the selected gate line 5. Then, the detecting circuit 57 detects the electric charges transferred via the respective data lines 6 between the respective detecting elements 100 which are provided along the selected gate line 5, and the detecting circuit 57. Paying attention to one gate signal line, explained below are operations of the uneven pattern detector 50 during a selection period of the target gate signal line. Note that, in the selection period, the drive circuit 56 applies the non-active signal to the other gate signal lines, so as to switch OFF the TFTs 7 in the respective detecting elements 100 that are connected to the other gate signal lines respectively.

The detecting elements provided along the target gate line (one row of the detecting elements in the sensor array 55) respectively correspond to the intersections of the target gate line and the plurality of data lines. As shown in FIG. 2, the data lines are respectively connected with the respective CSAs as electric charge detecting means stored in the detecting circuit 57. The respective detecting elements provided along the target gate line and respective sections composed of the respective detecting elements and the corresponding CSAs operate respectively in a similar way during the selection period of the target gate line. Therefore, explained below in detail are only operations of one detecting element connected to the target gate line (hereinafter referred to as a "target detecting element") and a section composed of the target detecting element and the corresponding CSA (hereinafter referred to as a "target detecting element related section") in the uneven pattern detector 50.

Figure 5:
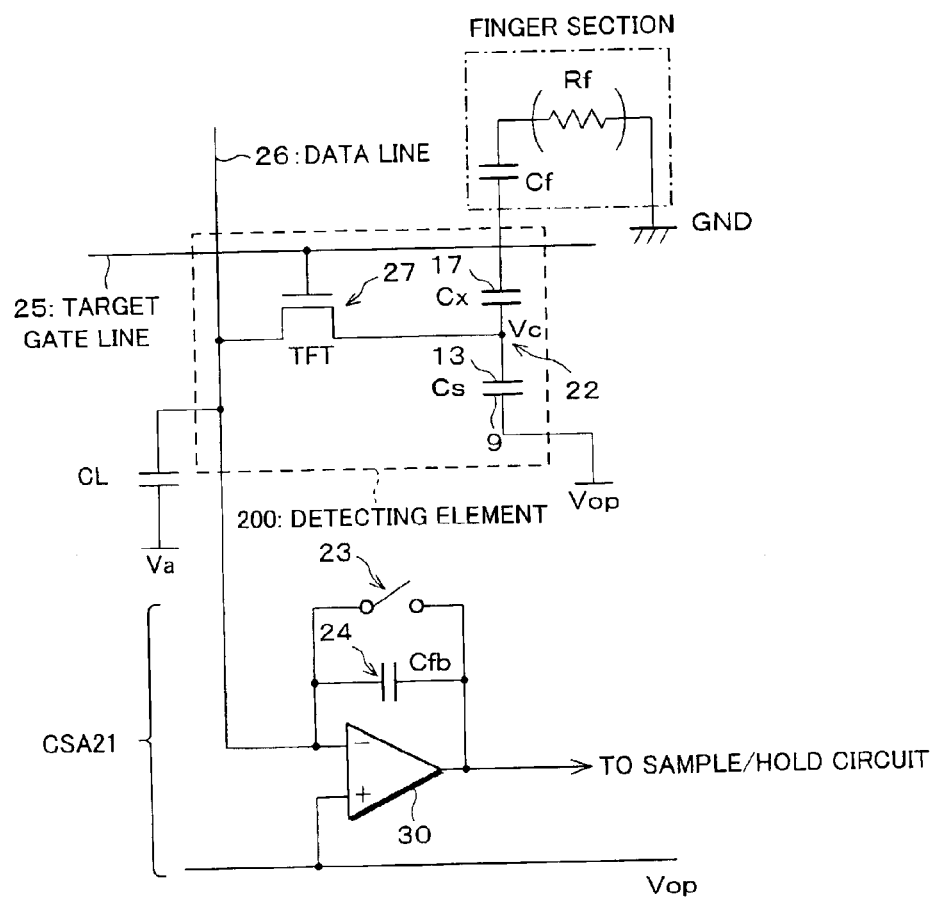
FIG. 5 is a circuit diagram showing an equivalent circuit of a target detecting element related section in the first embodiment.

FIG. 5 is a circuit diagram showing an equivalent circuit, which corresponds to the target element related section in the state where the finger as the detection object is placed on the detecting surface, which corresponds to the upper surface of the sensor array 55 in the uneven pattern detector 50. A target detecting element 200 in the target detecting element related section is a detecting element corresponding to an intersection of a target gate line 25 and a data line 26. The data line 26 is connected with one CSA 21 as the electric charge detecting means in the detecting circuit 57.

The detecting element 200 includes (a) a TFT 27 corresponding to the TFT 7 in FIG. 4, (b) a capacitance Cx formed with the upper layer detecting electrode 17 and the capacitor forming layer 18, and (c) the auxiliary capacitor Cs formed with the lower layer detecting electrode 13, the gate insulation film 10, and the auxiliary capacitor electrode 9. A source of the TFT 27 is connected to the data line, a drain of the TFT 27 is connected to the detecting electrode (the electrode composed of the upper layer electrode 17 and the lower layer detecting electrode 13) 22, and a gate of the TFT 27 is connected to the gate line, so that the TFT 27 functions as the switching element.

The CSA 21 is composed of an operational amplifier (Op-Amp) 30, a feedback condenser 24, and a reset switch 23. An output terminal of the operational amplifier 30 is connected to the sample/hold circuit 110 (see FIG. 2), whereas a negative-phase input terminal is connected to the data line 26. Further, a positive-phase input terminal of the operational amplifier 30 is connected to the auxiliary capacitor electrode 9. Therefore, the voltage Vop supplied to the positive-phase input terminal of the operational amplifier is also supplied to the auxiliary capacitor electrode 9, so that the positive-phase input terminal and the auxiliary capacitor electrode 9 are maintained at the same potential (Note that, the positive-phase input terminal and the auxiliary capacitor electrode 9 may be maintained at the same potential without being directly connected). Further, a terminal of the feedback condenser 24 is connected to the negative-phase input terminal of the operational amplifier, whereas the other terminal of the feedback condenser 24 is connected to an output terminal of the operational amplifier 30. The reset switch 23 is connected in parallel to the feedback condenser 24 and is switched ON/OFF by the control section 60. Note that, in the following, a feedback capacitance, which is a capacitance of the feedback condenser 24, is indicated by a symbol "Cfb".

In addition to the detecting element 200 and the CSA 21, the equivalent circuit shown in FIG. 5 includes (a) a capacitance Cf, which are formed with the upper surface of the capacitor forming layer 18, the finger surface that is the detection object, and an air layer, (b) a resistor Rf between the finger surface and the frame-shaped electrode pad 53, and (c) a parasitic capacitor CL of the data line 26. Note that, in the present embodiment, the finger (a human body) that is the detection object is grounded via the frame-shaped electrode pad 53.

Operations of the target detecting element related section are explained below in accordance with the equivalent circuit. Note that, in the following calculation, a GND level (ground level), which is a finger potential, is used as a reference.

Figure 6:
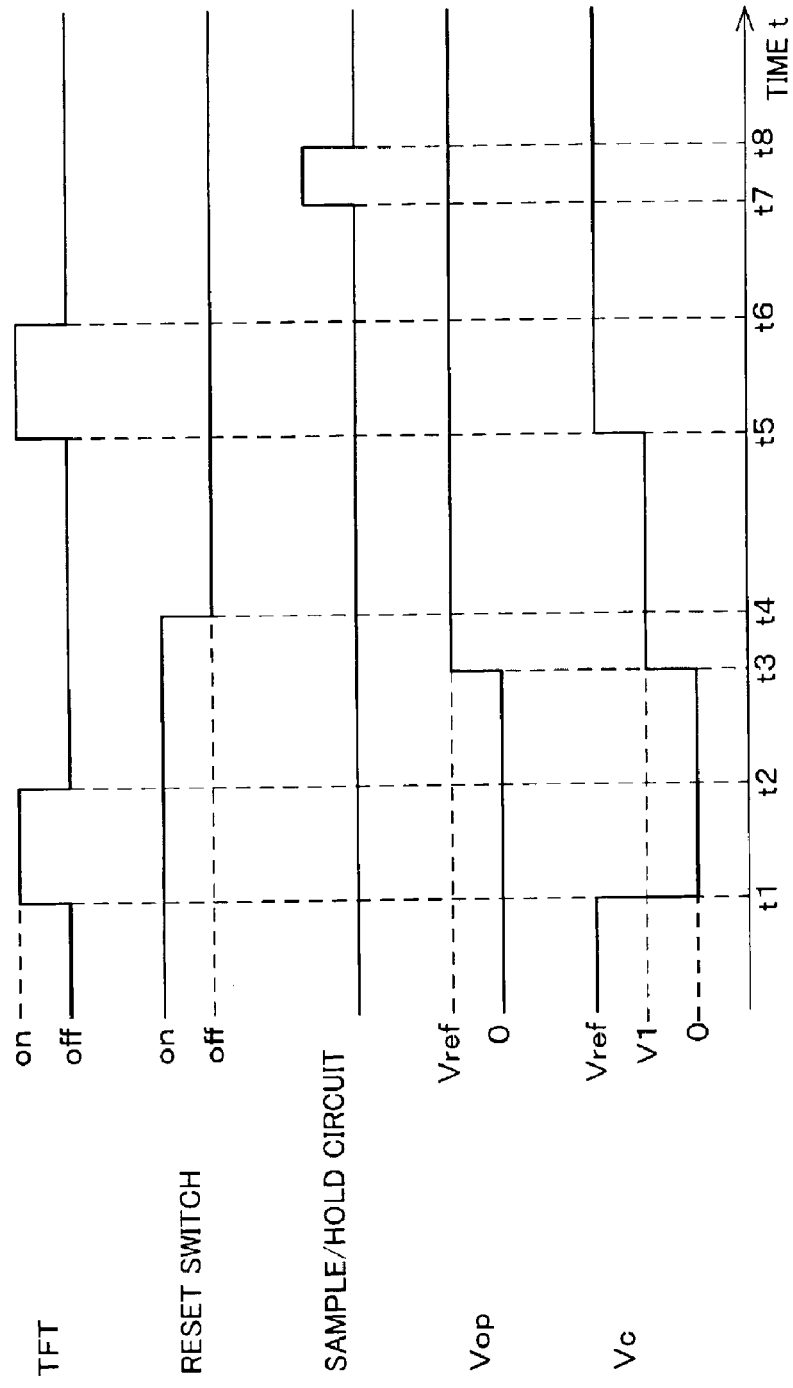
FIG. 6 is a timing chart explaining operations of the target detecting element related section in the first embodiment.

FIG. 6 is a timing chart for explaining operations of the target detecting element related section. The control section 60 controls the drive circuit 56 and the detecting circuit 57 so as to change an ON/OFF state of the TFT 27, an ON/OFF state of the reset switch 23, and the voltage (hereinafter referred to as a "positive-phase input voltage", or an "input voltage of the CSA 21") Vop of the positive-phase input terminal of the operational amplifier 30 in accordance with a sequence shown in the timing chart.

More specifically, in order to set the target detecting element related section to be in an initial state, the reset switch 23 is switched ON and the positive-phase input voltage Vop is set at the GND level (Vop=0).

After this, at time t1, the drive circuit 56 applies the active signal to the gate line 25 so as to switch ON the TFT 27. At this point, a potential Vc of the detecting electrode 22 is "0". Thus, a voltage is not applied to Cf and Cx, so that charged electric charges of these capacitors become "0".

As described above, the capacitors Cf and Cx do not accumulate the electric charges, and accumulated charges therefore do not exist in a coupled capacitance (hereinafter referred to as a "target capacitor", and indicated as a symbol "Cfx") formed by serial coupling of the capacitors Cf and Cx. Namely, the TFT 27 is switched ON at the time t1, so that the charged electric charges of the target capacitor Cfx and the auxiliary capacitor Cs become "0".

Next, at time t2, the drive circuit 56 applies the non-active signal to the gate line 25 so as to switch OFF the TFT 27. At this point, the target capacitor Cfx and the auxiliary capacitor Cs are maintained in a state where the charged electric charges are "0" (a reset state).

Next, at time t3, while the TFT 27 is OFF, the positive-phase input voltage Vop, which is the input voltage of the CSA 21, is switched from the GND level to a predetermined potential (hereinafter referred to as a "reference potential") Vref. At this point, the target capacitor Cfx and the auxiliary capacitor Cs form a serial capacitor. Thus, voltages respectively applied to the capacitors Cfx and Cs are inversely proportional to a value of the serial capacitor. Therefore, the potential Vc of the detecting electrode 22 becomes V1 as defined in the following equation:

$$V1=\{Cs/(Cfx+Cs)\}\cdot Vref \qquad (1)$$

Further, at this point, electric charges Qfx charged to the target capacitor Cfx, and electric charges Qs charged to the auxiliary capacitor Cs become as follows:

$$Qfx=Qs=Cfx\cdot V1 \qquad (2)$$

Note that, electric charges QL are also accumulated to the parasitic capacitor CL of the data line 26. However, because the reset switch 23 of the CSA 21 is ON, the CSA 21 does not detect the electric charges charged to the parasitic capacitor CL.

The parasitic capacitor CL of the data line 26 is mainly composed of (a) a capacitor Ccsd (see FIG. 3) based on an overlapping section of the Cs line 95 which is a wiring electrode section in the auxiliary capacitor electrode 9 and the data line electrode 6 composing the data line 26, (b) a capacitor Cgd based on an overlapping section of the data line electrode 6 composing the data line 26 and the gate line electrode 5 composing the gate line 25, and (c) a parasitic capacitor Ccd of the data line electrode 6 composing the data line 26 and the detecting electrode 22.

The data line 26 can be regarded to have an identical potential (=Vref) with the positive-phase input terminal of the operational amplifier 30. Thus, the electric charges QL charged to the parasitic capacitor CL of the data line 26 is determined in the following equation using Ccsd, Cgd, Ccd, and Vref:

$$QL=f\ (Ccsd,\ Cgd,\ Ccd,\ Vref) \qquad (3)$$

Next, at time t4, the reset switch 23 is switched OFF, and the CSA 21 is enabled to detect the electric charges.

After this, at time t5, the TFT 27 is switched ON. This changes the potential Vc of the detecting electrode 22 to the reference potential Vref. In this process, the target capacitor Cfx and the auxiliary capacitor Cs are charged and discharged according to changes in potential of the detecting electrode 22. At this point, since the voltage to be applied to the target capacitor Cfx is Vref, the electric charges Qfx charged to the target capacitor is expressed as follows:

$$Qfx=Cfx\cdot Vref \qquad (4)$$

Further, since the potential of the auxiliary capacitor electrode 9 equals the positive-phase input voltage Vop=Vref, the voltage is not applied to the auxiliary capacitor Cs. Thus, the charged electric charges Qs are expressed as follows:

$$Qs=0 \quad (5)$$

As described above, in the process in which the potential Vc of the detecting electrode 22 is changed into the reference potential Vref, the electric charges are transferred between the CSA 21 and the detecting electrode 22 via the TFT 27. The transferred electric charges are detected by the CSA 21 as electric charges charged at the feedback capacitor Cfb (Hereinafter, it is assumed that the electric charges transferred from the detecting electrode 22 to the CSA 21 are detected).

Note that, at this point, the electric charges are also charged to the parasitic capacitor CL of the data line 26. However, influence of the parasitic capacitor CL on the detected electric charges of the CSA 21 is negligible in comparison to the detected electric charges of the detection object Cfx (the details are described later).

Therefore, the electric charges detected by the CSA 21 is a change amount in the electric charges (Qfx−Qs) of the detecting electrode 22 in the target detecting element 200 during the above process (around the time when the TFT is switched ON). According to the equations (1), (2), (4), and (5), the detected electric charges ΔQ are expressed as follows:

$$\Delta Q = -Cfx \cdot Vref \quad (6)$$

Next, at time t6, the TFT 27 is switched OFF. Then, in the detecting circuit 57, the sample/hold circuit 110 samples and holds an output signal from the CSA 21 during a period of time t7 to t8 in which the TFT 27 is in the OFF-state.

In the same way, in the detecting circuit 57, the sample/hold circuit 110 samples and holds the output signals from the CSAs connected to the other data lines. The output signal of the CSA 21 reflects the target capacitor Cfx according to the equation (6). Thus, in accordance with the operations of the target gate line 25 in the selection period, the sample/hold circuit 110 holds as the detected data the signal that reflects the target capacitors Cfx in the respective detecting elements provided along the target gate line 25. This means detection of the target capacitor Cfx, i.e., the capacitance formed between the finger surface that is the detection object and the detecting electrode 22. In this way, the detected data for one row in the sensor array 55 can be obtained corresponding to the target gate line 25. The detected data are sent from the detecting circuit 57 as the serial detected data Dout, and are temporarily stored at the control section 60.

The plurality of gate lines composing the sensor array 55 are sequentially selected by the drive circuit 56 and are operated in a similar way as described above in respective selection periods. As a result, the detected data corresponding to respective rows (respective gate lines) of the sensor array 55 are sequentially transferred as the serial data Dout from the detecting circuit 57 to the control section 60, and then the control section 60 obtains one frame of the detected data. The detected data for one frame are the fingerprint data indicating a pattern of the fingerprint unevenness of the finger placed on the detecting surface of the uneven pattern detector 50.

As described above, the electric charges ΔQ detected by the CSA 21 are basically determined only by (a) the target capacitor Cfx reflecting the fingerprint unevenness on the finger surface and (b) an input voltage difference of the CSA 21 (Vref that is the change amount of the positive-phase voltage Vop). The auxiliary capacitor Cs is not reflected to the detected electric charges ΔQ of the CSA 21. Therefore, the dynamic range of the CSA 21 is not limited by the auxiliary capacitor Cs. Further, differences in the auxiliary capacitors Cs among detecting elements do not cause an error in the detected data.

1.4 The Parasitic Capacitor CL and the Auxiliary Capacitor Cs 1.4.1 Influence of the Parasitic Capacitor CL The parasitic capacitor CL of the data line 26 is mainly composed of (a) the capacitor Ccsd (see FIG. 3) based on the overlapping section of the Cs line 95 which is the wiring electrode section in the auxiliary capacitor electrode 9 and the data line electrode 6 composing the data line 26, (b) the capacitor Cgd based on the overlapping section of the data line electrode 6 composing the data line 26 and the gate line electrode 5 composing the gate line 25, and (c) the parasitic capacitor Ccd of the data line electrode 6 composing the data line 26 and the detecting electrode 22.

As for the capacitor Ccsd, the Cs line 95 (auxiliary capacitor electrode 9) is connected to the positive-phase input terminal of the operational amplifier 30 composing the CSA 21, and the negative-phase input terminal of the CSA 21 is connected with the data line 26 (see FIG. 5), so that the data line 26 has an identical potential with the Cs line 95. Therefore, the charged electric charges of the capacitor Ccsd do not change, and the capacitor Ccsd does not affect the electric charges to be detected by the CSA 21.

As for the capacitor Cgd, the charged electric charges change when the TFT 27 is switched ON/OFF. However, in the above-described detecting method, the TFT 27 is OFF at the time t4 when the reset switch 23 in the CSA 21 is switched OFF. Then, after the TFT 27 is switched ON, the TFT 27 is switched OFF again so as to sample the output signal from the CSA 21 (FIG. 6). As described above, the TFT 27 is switched in the ON/OFF cycle during a period in which the CSA 21 detects the data, thereby canceling the change in the charged electric charges of the capacitor Cgd. As a result, the CSA 21 can detect the electric charges without being affected by the capacitor Cgd.

As for the parasitic capacitor Ccd, only the parasitic capacitor Ccd in the respective detecting elements provided along the selected gate line (target gate line) 25 may be added to the detected data. In the detecting method, the reset switch 23 is switched OFF after the input voltage Vop of the CSA 21 is switched to Vref (FIG. 6). Thus, the parasitic capacitors Ccd of the detecting elements corresponding to non-selected gate lines (gate lines other than the target gate line 25) do not affect the electric charges detected by the CSA 21. The parasitic capacitor Ccd is on an order of $10^{-15}$ [F] at most per detecting element. On the contrary, the target capacitor Cfx at a concave part of the fingerprints is on an order of $10^{-12}$ [F]. Therefore, the influence of the parasitic capacitor Ccd on the detected electric charges of the CSA 21 is quite small and negligible.

As described above, the parasitic capacitor CL of the data line 26 does not affect the electric charges to be detected by the CSA 21, or the influence of the parasitic capacitor CL is negligible. Therefore, it can be assumed that the parasitic capacitor CL does not affect the detected data obtained by the above-described detecting method.

Note that, in the equivalent circuit shown in FIG. 5 and the equivalent circuit shown in FIG. 7 (to be described later), a potential supplied to the other side of the data line 26 (the data line electrode 6) with respect to the parasitic capacitor CL of the data line 26 is represented by Va. However, as described above, a different potential is supplied in accordance with the respective capacitors composing the parasitic capacitor CL. For example, the capacitor Ccsd is supplied with the potential of the auxiliary capacitor electrode 9 (the Cs line 95) as Va.

1.4.2 Effects of the auxiliary capacitor Cs

The voltage can be applied to the detecting electrode 22 only with the input voltage Vop of the CSA 21 via the data line 26. Therefore, when the TFT 27 is OFF, the detecting electrode 22 is not applied with the voltage.

First, for comparison with the present embodiment, a case is assumed where the auxiliary capacitor Cs does not exist. When the auxiliary capacitor Cs does not exist, the detecting electrode 22 is only connected with the TFT 27 and the target capacitor Cfx (the coupled capacitance formed by the serial coupling of the capacitor Cx and the capacitor Cf). In this case, when the TFT 27 is OFF, there is no means for applying the voltage to the detecting electrode 22. Thus, there is no mechanism for maintaining the potential Vc of the detecting electrode 22, i.e. the charged electric charges of the target capacitor Cfx.

Therefore, if a potential state changes around the detecting electrode 22 when the TFT 27 is OFF, the influence of the potential change on the detecting electrode 22 is exclusively absorbed in the target capacitor Cfx. At this point, the charged electric charges of the target capacitor Cfx changes in accordance with the influence of the potential change. However, there is no object in a system of the detecting electrode 22, to which the target capacitor Cfx charges or discharges, so that the target capacitor Cfx is required to charge or discharge the electric charges to an object that is outside of the system. At this point, conservation of charge is not realized in the detecting electrode 22. The charged electric charges of the target capacitor Cfx reflect the information of the fingerprint unevenness of the finger as the detection object. Thus, when the electric charges are not stored in the detecting electrode 22, the detected electric charges of the CSA 21 have an error.

Next, a case is assumed where the auxiliary capacitor Cs is connected with the detecting electrode 22 as in the present embodiment. This case is the same as the previous case where the auxiliary capacitor does not exist, in that there is no means for applying the voltage to the detecting electrode 22 when the TFT 27 is OFF. However, in this case where the auxiliary capacitor Cs exists, even when the TFT 27 is OFF, the potential Vc of the detecting electrode 22 is fixed in accordance with values of capacitors Cfx and Cs, by a voltage applied to the target capacitor Cfx and the auxiliary capacitor Cs (a voltage applied between the auxiliary capacitor electrode 9 and an earth point). In other words, with regard to the two capacitors connected in series, when the potential is fixed at both ends of the coupled capacitance, the potential between the two capacitors (the charged electric charges) is fixed. This relatively stabilizes the potential (the charged electric charges) in comparison to the case where only one capacitor is provided in which one end of the capacitor is floated. Therefore, the influence that the detecting electrode 22 (the electric charges of the detecting electrode 22) suffers from the potential change around the detecting electrode 22 is significantly small in comparison to the case where the auxiliary capacitor Cs does not exit. Therefore, by providing the auxiliary capacitor Cs, it is possible to reduce the error in the electric charges to be detected by the CSA 21, and thus it is possible to obtain accurate detected data.

1.5 Effects of the First Embodiment

According to the arrangement, the auxiliary capacitor Cs stabilizes the potential of the detecting electrode 22 even when the TFT 27 is OFF. This reduces the error in the electric charges to be detected by the CSA 21, and thus it is possible to obtain the accurate detected data.

According to the embodiment, the data line 26 and the auxiliary capacitor electrode 9 are maintained at the same potential, and the auxiliary capacitor Cs is thus not reflected to the electric charges detected by the CSA 21. Thus, the dynamic range of the CSA 21 is not limited by the auxiliary capacitor Cs. Further, differences in the auxiliary capacitors Cs among detecting elements do not cause the error in the detected data.

Further, according to the embodiment, the auxiliary capacitor electrode 9 is formed below the detecting electrode 22 so as to approximately cover the detecting electrode 22 (FIG. 4). This has an effect that the detecting electrode composed of the upper layer detecting electrode 17 and the lower layer detecting electrode 13 is electrostatically shielded from below. This reduces the influence that the electric charges at the detecting electrode 22 are suffered from the potential change around the detecting electrode 22. This reduces the error in the electric charges to be detected by the CSA 21, thereby improving accuracy of the detected data.

Further, in the present embodiment, the frame-shaped electrode pad 53 is provided around the sensor array 55, and the frame-shaped electrode pad 53 is grounded. Thus, when the finger, which is the detection object, or the human body is charged, the static charge in the detection object is dissipated via the frame-shaped electrode pad 53. This prevents electrostatic discharge damage of the uneven pattern detector 50 due to the charge of the detection object.

Note that, in the present embodiment, as described above, it can be assumed that the parasitic capacitor CL of the data line 26 has no influence on the detected data obtained in the detecting method.

Further, in the present embodiment, by covering the upper surface of the upper layer detecting electrode 17 with the capacitor forming layer 18 (by composing the detecting surface with the insulation layer which coats upper surfaces of the plurality of detecting elements), it is possible to protect the detecting electrode from an outside electric load, such as static electricity and a pressure load by contact.

Note that, in the present embodiment, the capacitor forming layer 18 is provided as described above, but the capacitor forming layer 18 is not necessarily required and can be omitted in the arrangement, if the detection of the fingerprint uneven pattern of the finger is only taken into consideration. In this case, only Cf is the target capacitor.

In this case, when the target capacitor Cf becomes "0", the detecting electrode becomes the GND, and the negative-phase input terminal of the CSA 21 is short-circuited to the GND when the TFT 27 is ON. This is not desirable in terms of the circuit configuration (see FIG. 5). However, in reality, even when the concave part of the finger, in which Cf has the smallest value, completely contacts the detecting electrode, Cf does not completely become "0" because of a coat on the finger surface and other reasons.

Second Embodiment

Next, explained is an uneven pattern detecting device using an uneven pattern detector in accordance with a second embodiment of the present invention. Note that, for convenience of explanation, identical or corresponding constituent members with those in the first embodiment are assigned with the same reference symbols, thus their detailed explanation is omitted here (see FIGS. 1 to 4).

An arrangement and a manufacturing method of the uneven pattern detector in accordance with the present embodiment are the same as those in the first embodiment.

Further, an overall arrangement of the uneven pattern detecting device in accordance with the present embodiment is basically the same as that in the first embodiment, but a detecting method of the uneven pattern adopted in the present embodiment differs from the detecting method of the uneven pattern adopted in the first embodiment. Thus, the detecting method of the uneven pattern such as the fingerprints by the uneven pattern detecting device in accordance with the present embodiment is explained below. Note that, as in the explanation in the first embodiment, the following explanation will be given by paying attention to one gate line 25. Explained below in detail are only operations of a section including a target detecting element, which is one detecting element connected to the target gate line 25, and of a section composed of the target detecting element and the corresponding CSA, namely a target detecting element related section.

Figure 7:
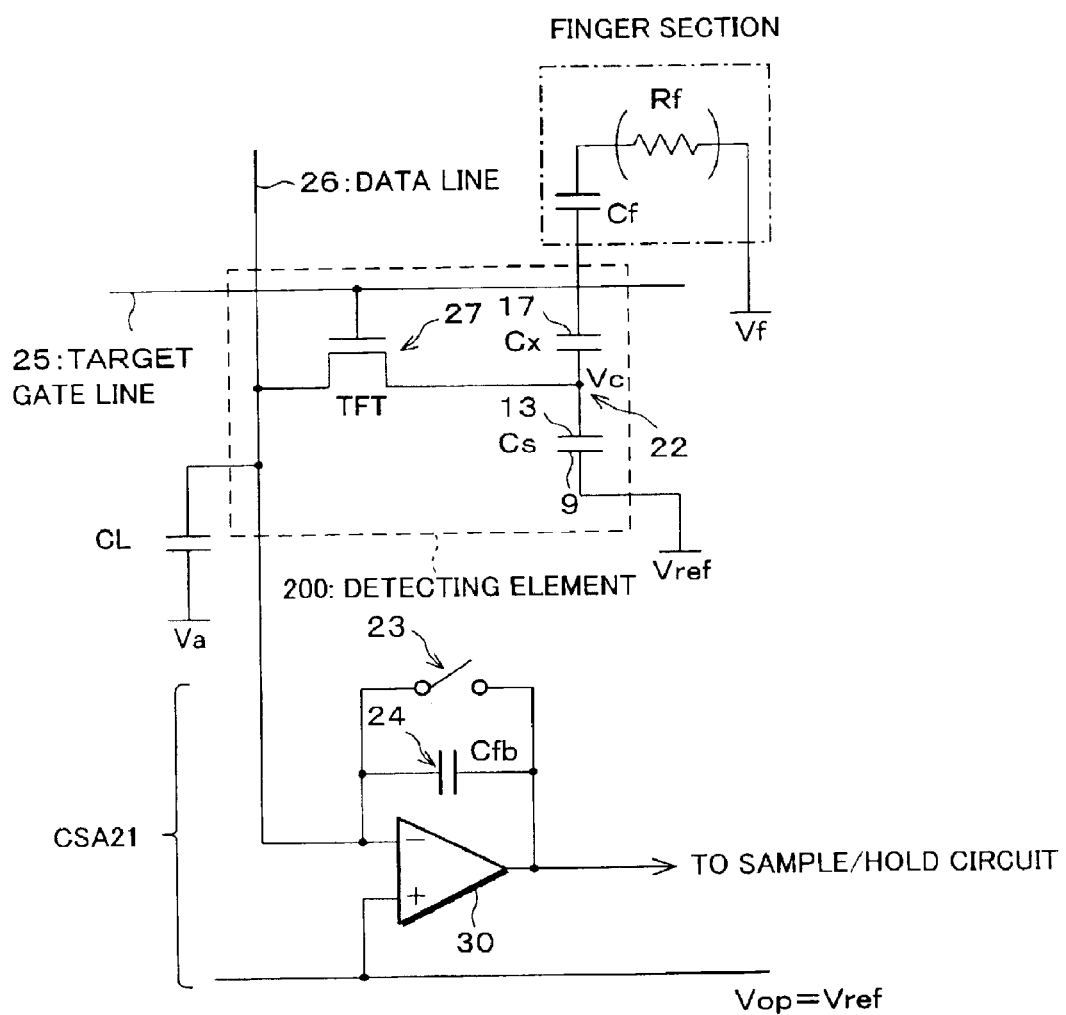
FIG. 7 is a circuit diagram showing an equivalent circuit of a target detecting element related section in a second embodiment of the present invention.

FIG. 7 is a circuit diagram showing an equivalent circuit, which corresponds to the target element related section, when the finger as the detection object is placed on the upper surface (the detecting surface) of the sensor array 55 in the uneven pattern detector 50 in accordance with the present invention. This equivalent circuit basically has the same arrangement as the equivalent circuit in the first embodiment shown in FIG. 5. Therefore, the same reference symbols are assigned to the same sections, thus their detailed explanation is omitted here.

In the present embodiment, unlike the first embodiment, the input voltage Vop of the CSA 21 is fixed at a constant potential Vref during a sequential procedure for the detecting operations. In other words, the positive-phase input terminal of the operational amplifier 30 and the auxiliary capacitor electrode 9 which is connected to the positive-phase input terminal of the operational amplifier 30 are fixed at the constant potential Vref (hereinafter referred to as the "reference potential").

Figure 8:
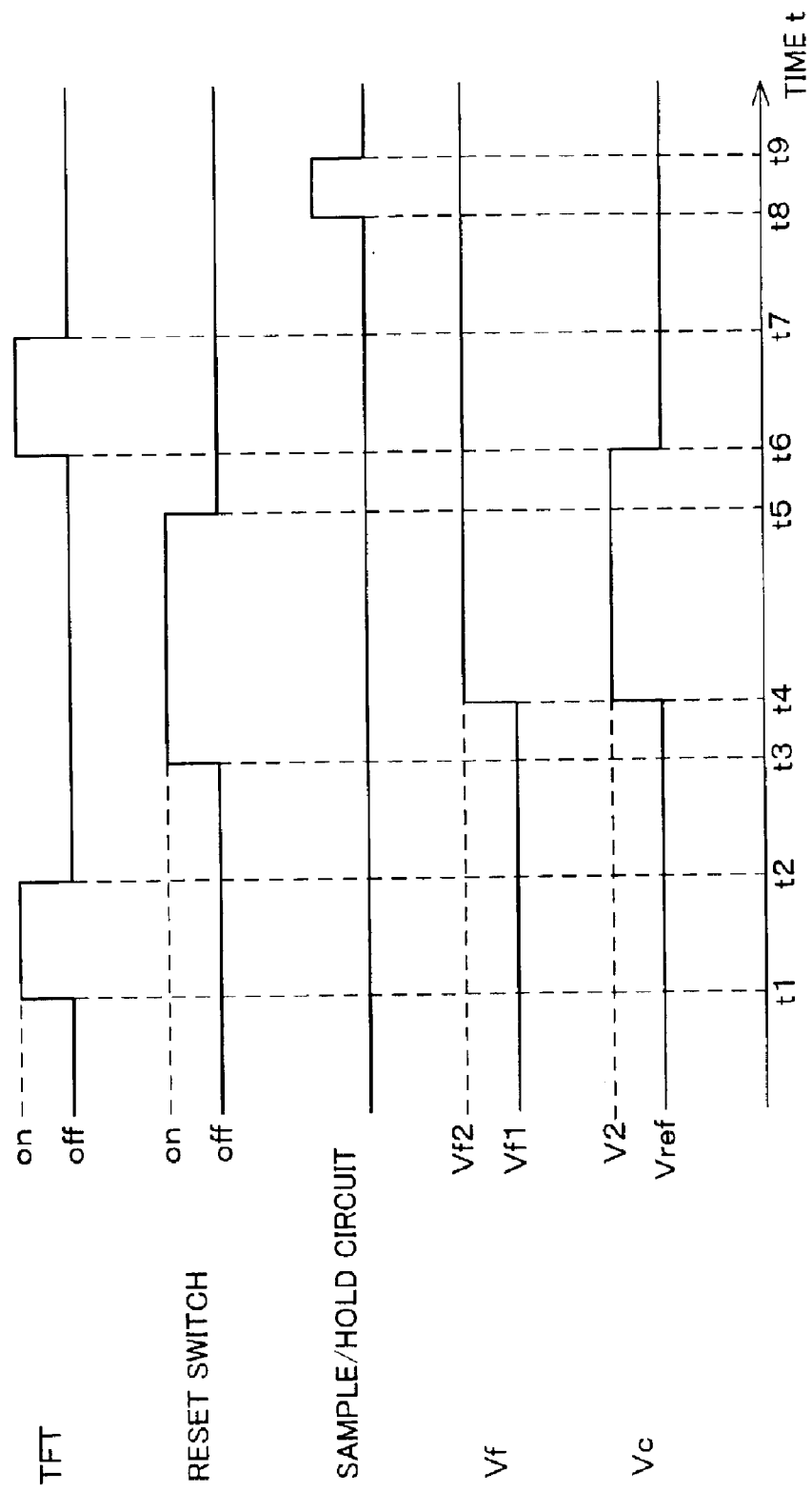
FIG. 8 is a timing chart explaining operations of the target detecting element related section in the second embodiment.

FIG. 8 is a timing chart for explaining operations of the target detecting element related section in the present embodiment. The control section 60 controls the drive circuit 56, the detecting circuit 57, and a potential Vf (hereinafter referred to as a "finger potential") which is supplied to the finger (the human body) that is the detection object via the frame-shaped electrode pad 53 so as to change an ON/OFF state of the TFT 27, an ON/OFF state of the reset switch 23, and the finger potential Vf in accordance with a sequence shown in the timing chart.

More specifically, in order to set the target detecting element related section to be in an initial state, the TFT 27 is switched ON at time t1, while being supplied with a first potential Vf1 which is predetermined as the finger potential Vf. Because the potential of the data line 26 can be regarded to be equal to the positive-phase input voltage Vop=Vref, the potential Vc of the detecting electrode 22 is expressed as follows:

$$Vc=Vref \quad (7)$$

Then, the charged electric charges Qfx of the target capacitor Cfx and the charged electric charges Qs of the auxiliary capacitor Cs are respectively expressed as follows:

$$Qfx=Cfx \cdot (Vref-Vf1) \quad (8)$$

$$Qs=0 \quad (9)$$

Next, at time t2, the TFT 27 is switched OFF. Then, at time t3, the reset switch 23 is switched ON. During a period in which the reset switch 23 is ON, the feedback capacitor Cfb of the CSA 21 is not charged.

Next, at time t4, the finger potential Vf is changed from the first potential Vf1 to a predetermined second potential Vf2. At this point, the potential Vc of the detecting electrode 22 becomes V2 as defined in the following equation:

$$V2=Vref+\{Cfx/(Cfx+Cs)\} \cdot (Vf2-Vf1) \quad (10)$$

Then the charged electric charges Qfx of the target capacitor Cfx and the charged electric charges Qs of the auxiliary capacitor Cs are respectively expressed as follows:

$$Qfx=Cfx \cdot (V2-Vf2) \quad (11)$$

$$Qs=Cs \cdot (Vref-V2) \quad (12)$$

Next, at time t5, the reset switch 23 is switched OFF, and the CSA 21 is then enabled to detect the electric charges.

After this, at time t6, the TFT 27 is switched ON, and the potential Vc of the detecting electrode 22 becomes as follows:

$$Vc=Vref \quad (13)$$

Then, the charged electric charges Qfx of the target capacitor Cfx and the charged electric charges Qs of the auxiliary capacitor Cs are respectively expressed as follows:

$$Qfx=Cfx \cdot (Vref-Vf2) \quad (14)$$

$$Qs=0 \quad (15)$$

As described above, in the process in which the potential Vc of the detecting electrode 22 is changed into the reference potential Vref, the electric charges are transferred between the CSA 21 and the detecting electrode 22 via the TFT 27. The transferred electric charges are detected by the CSA 21 as electric charges charged at the feedback capacitor Cfb (Hereinafter, it is assumed that the electric charges transferred from the detecting electrode 22 to the CSA 21 are detected). Therefore, the electric charges detected by the CSA 21 is a change amount in the electric charges (Qfx–Qs) of the detecting electrode 22 in the target detecting element 200 during the above process (around the time when the TFT is switched ON). According to the equations (10), (11), (12), (14), and (15), the detected electric charges ΔQ are expressed as follows:

$$\Delta Q=Cfx \cdot (Vf2-Vf1) \quad (16)$$

Next, at time t7, the TFT 27 is switched OFF. Then, in the detecting circuit 57, the sample/hold circuit 110 samples and holds an output signal from the CSA 21 during a period of time t8 to t9 in which the TFT 27 is in the OFF-state.

In the same way, in the detecting circuit 57, the sample/hold circuit 110 samples and holds the output signals from the CSAs connected to the other data lines. The output signal of the CSA 21 reflects the target capacitor Cfx according to the equation (16). Thus, in accordance with the operations of the target gate line 25 in the selection period, the sample/hold circuit 110 holds as the detected data the signal that reflects the target capacitor Cfx in the respective detecting elements provided along the target gate line 25. This means detection of the target capacitor Cfx, i.e., the capacitance formed between the finger surface that is the detection object and the detecting electrode 22. In this way, the detected data for one row in the sensor array 55 can be obtained corresponding to the target gate line 25. The detected data are serially sent from the detecting circuit 57, and are temporarily stored at the control section 60.

The plurality of gate lines composing the sensor array 55 are sequentially selected by the drive circuit 56 and are operated in a similar way as described above in respective selection periods. As a result, the detected data corresponding to respective rows (respective gate lines) of the sensor array 55 are sequentially transferred to the control section 60, and then the control section 60 obtains one frame of the detected data. The detected data for one frame are the fingerprint data indicating a pattern of the fingerprint unevenness on the finger placed on the detecting surface of the uneven pattern detector 50.

Incidentally, in the described detecting method, the finger potential Vf is changed from Vf1 to Vf2 during the selection period of one gate line. However, the finger potential Vf may be fixed for one frame period, and may be switched between Vf1 and Vf2 per one frame period.

As described above, the electric charges ΔQ detected by the CSA 21 are basically determined only by (a) the target capacitor Cfx reflecting the fingerprint unevenness on the finger surface and (b) the change amount of the finger potential Vf (Vf2−Vf1). The auxiliary capacitor Cs is not reflected to the detected electric charges ΔQ of the CSA 21 (see the equation (16)). Therefore, the dynamic range of the CSA 21 is not limited by the auxiliary capacitor Cs. Further, differences in the auxiliary capacitors Cs among detecting elements do not cause an error in the detected data. Further, a reason that the parasitic capacitor CL of the data line does not affect the detected data and effects of the auxiliary capacitor Cs in the detecting method are the same as the first embodiment.

In the uneven pattern detecting method of the present embodiment, when the voltage (finger potential) Vf applied to the finger as the detection object is switched between the first voltage Vf1 and the second voltage Vf2 per one frame as described above, additional effects can be achieved as follows. Namely, when identical fingerprints are successively detected plural times for accumulating the detected data, by switching the finger potential Vf per one frame as described above, it is possible to omit a process for resetting the target capacitor Cfx per each frame (see a section corresponding to time t1 to t2 in FIG. 6) as in the detecting method in the first embodiment.

When the finger potential Vf is alternately switched between Vf1 and Vf2 as described above, the CSA 21 alternately detects the electric charges ΔQ and −ΔQ per one frame (see the equation (16)). In this manner, the electric charges having different polarities are alternately detected per one frame, but it is easy to compensate the electric charges during a stage for processing of the detected data so as to obtain the data having an identical polarity. Therefore, without carrying out the process for resetting the target capacitor Cfx, it is possible to successively detect the uneven pattern such as the fingerprints.

Note that, in the first and second embodiments, the predetermined potential including the ground potential is supplied to the finger (the human body) that is the detection object. For this reason, the frame-shaped electrode pad 53 is provided. The finger contacts the frame-shaped electrode pad 53 when the finger contacts the upper surface (the detecting surface) of the sensor array 55 so as to fix the potential of the human body corresponding the finger. By the way, resistance in the human body is approximately a few hundred Ω between a head and feet. Thus, the human body can be regarded as an approximately conductive state. Therefore, the finger (the human body) that is the detection object may be fixed at a specific potential in such a manner that the electrode pad is provided at a position other than a position in a vicinity of the sensor array 55, and a finger of the other hand of the hand including the finger subjected to the detection of the fingerprints contacts the electrode pad.

Third Embodiment

Next, explained is an uneven pattern detecting device using an uneven pattern detector in accordance with a third embodiment of the present invention. Note that, for convenience of explanation, identical or corresponding constituent members with those in the first embodiment are assigned with the same reference symbols, thus their detailed explanation is omitted here (see FIGS. 1 to 5).

An arrangement and a manufacturing method of the uneven pattern detector in accordance with the present embodiment are the same as those in the first embodiment. Further, an overall arrangement of the uneven pattern detecting device in accordance with the present embodiment is basically the same as that in the first embodiment, and effects derived from the arrangement are also basically the same as those in the first embodiment. However, a detecting method of the uneven pattern in the present embodiment differs from the detecting method of the uneven pattern in the first embodiment. Thus, the detecting method of the uneven pattern such as the fingerprints by the uneven pattern detecting device in accordance with the present embodiment is explained below. Note that, as in the explanation in the first embodiment, the following explanation will be given by paying attention to one gate line 25. Explained below in detail are only operations of a section including a target detecting element, which is one detecting element connected to the target gate line 25, and of a section composed of the target detecting element and the corresponding CSA, namely a target detecting element related section.

Figure 9:
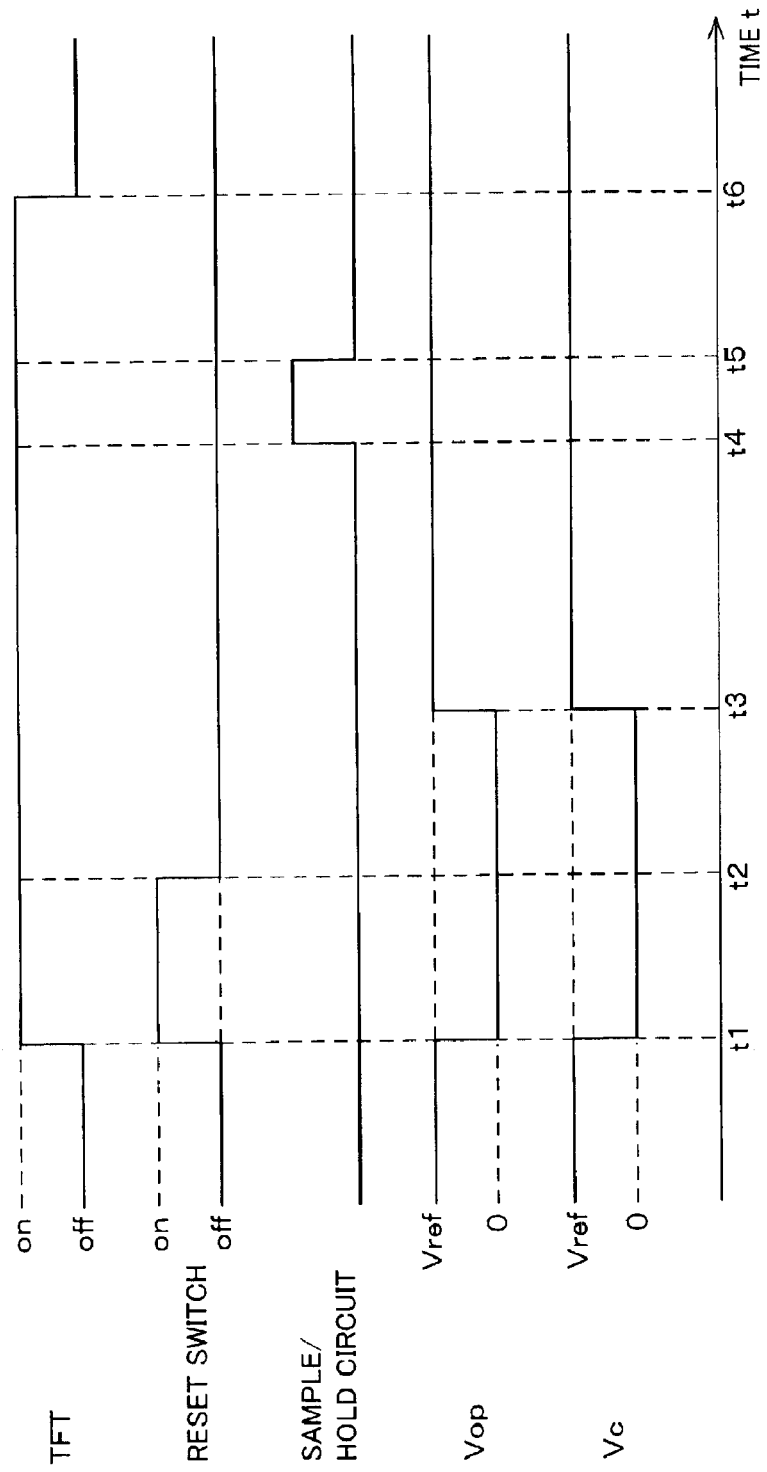
FIG. 9 is a timing chart explaining operations of a target detecting element related section in a third embodiment.
Figure 10:
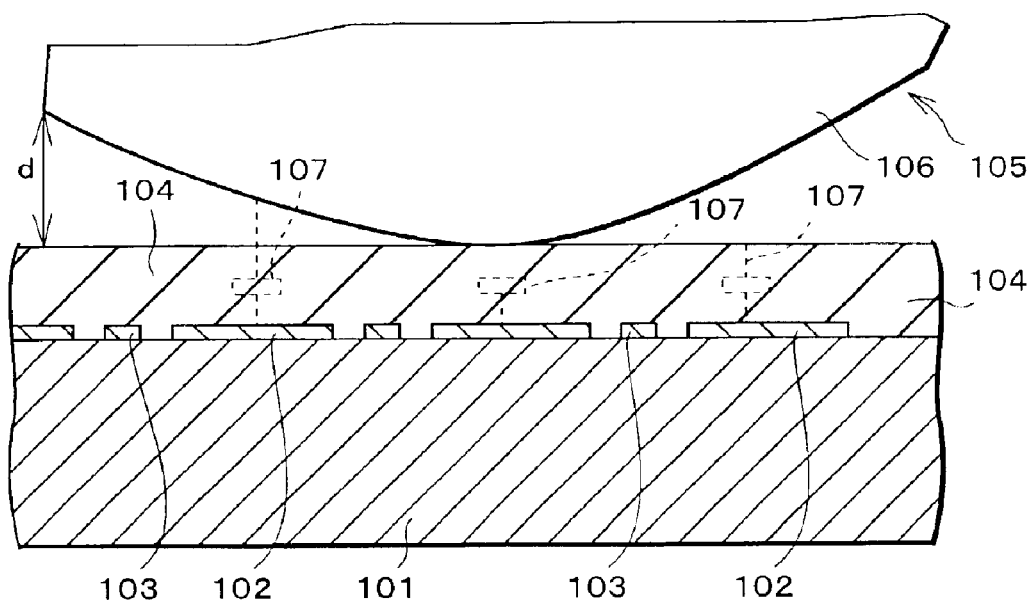
FIG. 10 is a partial sectional view for explaining a fingerprint detecting device of a capacitance method, which is a conventional uneven pattern detector.

FIG. 9 is a timing chart for explaining operations of the target detecting element related section.

As described above, the control section (sequence control means) 60 controls the drive circuit 56 and the detecting circuit 57 so as to change an ON/OFF state of the TFT 27, an ON/OFF state of the reset switch 23, and the potential (hereinafter referred to as a "positive-phase input voltage", or an "input voltage of the CSA 21") Vop of the positive-phase input terminal of the operational amplifier 30 in accordance with a sequence shown in the timing chart.

First, at time t1, in order to set the target detecting element related section to be in an initial state, the control section 60 switches ON the TFT (switching element) 27 and switches ON the reset switch 23. While the TFT 27 and the reset switch 23 are ON, the control section 60 supplies an identical potential with the potential supplied to the finger (the potential of the detection object) to the positive-phase input terminal of the operational amplifier 30 and the auxiliary capacitor electrode 9. Note that, the potential Vc of the detecting electrode 22 is at the GND level ("0") at this time, so that the positive-phase input voltage Vop is set at the GND level (Vop=0). Thus, the electric charges are not accumulated to the target capacitors Cfx, Cs and CL.

Next, at time t2, the reset switch 23 is switched OFF. At this point, the accumulated electric charges of Cfx, Cs and CL remain at "0". Subsequently, at time t3 (when the reset switch 23 is OFF and the TFT 27 is ON), the positive-phase input terminal and the auxiliary capacitor electrode 9 are supplied with a different potential with the potential supplied to the finger. In concrete, at time t3, the positive-phase input voltage Vop is switched from the GND level (the potential of the detection object) to the reference potential Vref.

At this point, the potential Vc of the detecting electrode 22 is also changed from the GND level (the potential of the detection object) to Vref. At this point, the electric charges Qfx charged to the target capacitor Cfx become as follows:

$$Qfx = Cfx \cdot Vref \qquad (17)$$

Further, the potential of the auxiliary capacitor electrode 9 equals the positive-phase input voltage Vop=Vref, the auxiliary capacitor Cs is thus not applied with the voltage. Thus, the charged electric charges Qs of the Cs become as follows:

$$Qs=0 \quad (18)$$

Further, the parasitic capacitor CL of the data line 26 approximates to the capacitor Ccsd based on the overlapping section of the Cs line 95 and the data line electrode 6 composing the data line 26. Because the data line 26 has the identical potential with and the Cs line 95, the charged electric charges of the capacitor Ccsd do not change. Thus, the charged electric charges of the parasitic capacitor CL become as follows:

$$QL=0 \quad (19)$$

Here, in the process in which the potential Vc of the detecting electrode 22 is changed into the reference potential Vref, the electric charges are transferred between the CSA 21 and the detecting electrode 22 via the TFT 27. The transferred electric charges are detected by the CSA 21 as electric charges charged at the feedback capacitor Cfb. According to the equations (17), (18), and (19), the detected electric charges ΔQ are expressed as follows:

$$\Delta Q = -Qfx = -Cfx \cdot Vref \quad (20)$$

Next, during a period of time t4 to t5 in which the reset switch 23 is in the OFF-state and the TFT 27 is in the ON-state, the sample/hold circuit 110 (the detecting circuit 57) samples and holds an output signal from the CSA 21 (the electric charges charged at the feedback capacitor Cfb). After this, at time t6, the TFT 27 is switched OFF.

In the same way, in the detecting circuit 57, the sample/hold circuit 110 samples and holds the output signals from the CSAs connected to the other data lines. The output signal of the CSA 21 reflects the target capacitor Cfx according to the equation (20). Thus, in accordance with the operations of the target gate line 25 in the selection period, the sample/hold circuit 110 holds as the detected data the signal that reflects the target capacitors Cfx in the respective detecting elements provided along the target gate line 25. This means detection of the target capacitor Cfx, i.e., the capacitance formed between the finger surface that is the detection object and the detecting electrode 22.

In this way, the detected data for one row in the sensor array 55 can be obtained corresponding to the target gate line 25. The detected data are sent from the detecting circuit 57 as the serial detected data Dout, and are temporarily stored at the control section 60.

The plurality of gate lines composing the sensor array 55 are sequentially selected by the drive circuit 56 and are operated in a similar way as described above in respective selection periods. As a result, the detected data corresponding to respective rows (respective gate lines) of the sensor array 55 are sequentially transferred as the serial data Dout from the detecting circuit 57 to the control section 60, and then the control section 60 obtains one frame of the detected data. The detected data for one frame are the fingerprint data indicating a pattern of the fingerprint unevenness on the finger placed on the detecting surface of the uneven pattern detector 50.

As described above, the electric charges ΔQ detected by the CSA 21 are basically determined only by (a) the target capacitor Cfx reflecting the fingerprint unevenness on the finger surface and (b) an input voltage difference of the CSA 21 (Vref that is the change amount of the positive-phase voltage Vop). The auxiliary capacitor Cs is not reflected to the detected electric charges ΔQ of the CSA 21. Therefore, the dynamic range of the CSA 21 is not limited by the auxiliary capacitor Cs. Further, differences in the auxiliary capacitors Cs among detecting elements do not cause the error in the detected data.

Influence of the parasitic capacitor CL of the data line on the detected data is basically the same as that in the first embodiment.

Specifically, in the detecting sequence, the TFT is held in the ON-state during the period from the time at which the electric charges ΔQ determined by the target capacitor Cfx are charged to the feedback capacitor Cfb, to the time at which the electric charges ΔQ are detected at the detecting circuit 57. Thus, the charged electric charges of the parasitic capacitor Cgd do not change, and the parasitic capacitor Cgd does not affect the detection of the electric charges ΔQ. Further, the parasitic capacitor Ccsd does not affect the detected electric charges for the same reason as in the first embodiment.

Further, effects of the auxiliary capacitor Cs in the detecting method are the same as those in the first embodiment.

As described above, the uneven pattern detector of the present invention is so arranged that the plurality of detecting elements are coated with an insulating layer so as to form the detecting surface.

With this arrangement, since a surface of the detecting electrode is coated with the insulation layer, it is possible to physically and electrically protect the detecting electrode from an external atmosphere.

The uneven pattern detector of the present invention may be arranged so as to further include potential application means for applying a predetermined potential to the detection object placed on the detecting surface.

With this arrangement, it is possible to supply a desired potential to the detection object. Therefore, the detection object may be grounded so as to dissipate electrostatic charges in the detection object, for example, thereby preventing electrostatic discharge damage to the detector. Further, another detecting method may be employed. More specifically, the capacitance (target capacitance) is detected in such a manner that the potential supplied to the detection object is changed and then the detecting circuit detects electric charges charged or discharged in accordance with the change.

The uneven pattern detector of the present invention is so arranged that the auxiliary capacitor electrode is provided on an opposite side of the detecting surface with respect to the detecting electrode, and is formed so as to cover almost an entire surface of the detecting electrode.

With this arrangement, the auxiliary capacitor electrode has an effect to electrostatically shield the detecting electrode from below, thereby reducing influence of a surrounding potential change on the electric charges at the detecting electrode. This reduces an error in the charged electric charges according to the capacitance between the detection object and the detecting electrode. Because of this, it is possible to detect the uneven pattern on the detection object more accurately.

The uneven pattern detector of the present invention may be so arranged that the corresponding detecting signal line and the auxiliary capacitor electrode are maintained at the same potential.

With this arrangement, while the switching element of the detecting element is ON, the electric charges are not accumulated in the capacitance formed between the detecting electrode and the auxiliary capacitor electrode in the detecting element. Thus, the capacitance detected by the detecting circuit is not affected by the auxiliary capacitor. As a result, the dynamic range in the detection of the capacitance is not limited by the auxiliary capacitor. Further, differences in the auxiliary capacitors among respective detecting elements do not affect the detection of the capacitance.

The uneven pattern detector of the present invention may be so arranged that the detecting circuit includes electric charge detecting means connected to the corresponding detecting signal line, the electric charge detecting means including (a) an operational amplifier having a negative-phase input terminal connected to the corresponding detecting signal line, (b) a feedback condenser in which one end is connected to the negative-phase input terminal and an other end is connected to an output terminal of the operational amplifier, and (c) a reset switch connected in parallel to the feedback condenser, for switching between the both ends of the feedback condenser, wherein the positive-phase input terminal of the operation amplifier and the auxiliary capacitor electrode are held at the same potential so as to maintain the corresponding detecting signal line and the auxiliary capacitor electrode at the same potential.

With this arrangement, when the switching element in the detecting element is switched ON, the potential supplied to the positive-phase input terminal of the operational amplifier becomes the potential of the detecting electrode in the detecting element. The electric charge detecting means detects the electric charges transferred between the detecting circuit and the detecting electrode in response to the potential, as the electric charges charged at the feedback condenser. The positive-phase input terminal of the operational amplifier and the auxiliary capacitor electrode are held at the same potential so as to maintain the corresponding detecting signal line and the auxiliary capacitor electrode at the same potential. Because of this, the detected electric charges are not affected by the auxiliary capacitor.

The uneven pattern detector of the present invention may be further arranged that the positive-phase input terminal of the operational amplifier is connected to the auxiliary capacitor electrode.

With this arrangement, it is possible to hold the positive-phase input terminal of the operational amplifier and the auxiliary capacitor electrode at the same potential so as to maintain the corresponding detecting signal line and the auxiliary capacitor electrode at the same potential. Because of this, the detected electric charges are not affected by the auxiliary capacitor.

The uneven pattern detector of the present invention having the foregoing arrangement may be further arranged so as to include potential application means for applying a predetermined potential to the detection object placed on the detecting surface.

With this arrangement, it is possible to supply a desired potential to the detection object.

The uneven pattern detecting device of the present invention may be arranged so as to include (a) the uneven pattern detector, and (b) sequence control means for controlling the drive circuit and the detecting circuit so as to change an ON/OFF state of the switching element, an ON/OFF state of the reset switch, and a potential of the positive-phase input terminal of the operational amplifier in a predetermined sequence, wherein the sequence control means carries out the steps of (1) switching ON the reset switch and the switching element, and supplying an identical potential with a potential of the detection object to the positive-phase input terminal of the operational amplifier and the auxiliary capacitor electrode while the reset switch and the switching element are ON, (2) switching OFF the switching element, and supplying a different potential from the potential of the detection object to the positive-phase input terminal of the operational amplifier and the auxiliary capacitor electrode while the reset switch is ON and the switching element is OFF, (3) switching OFF the reset switch, and switching ON the switching element so as to charge the feedback condenser while the reset switch is OFF, and (4) switching OFF the switching element, and controlling the detecting circuit to detect electric charges as charged at the feedback condenser while the reset switch and the switching element are OFF, wherein the sequence control means carries out said steps (1) through (4) in this order, and the capacitance formed between the detection object and each of the detecting electrodes according to the uneven pattern, is detected based on the electric charges detected in the said step (4).

With this arrangement, the capacitance (target capacitance) is formed between the detection object and each of the detecting electrodes according to the uneven pattern. Then, the electric charges determined by the capacitance are charged to the feedback condenser and the charged electric charges are detected. Note that, the sequence for detecting the capacitance includes the ON/OFF cycle of the switching element. This cancels the change in the charged electric charges at the parasitic capacitor of the detecting signal line, which is caused mainly by overlapping of the auxiliary capacitor and the drive signal line. Thus, the parasitic capacitor does not affect the detection of the electric charges.

Moreover, an uneven pattern detecting device of the present invention is arranged so as to include (a) the uneven pattern detector, and (b) sequence control means for controlling the drive circuit and the detecting circuit so as to change an ON/OFF state of the switching element, an ON/OFF state of the reset switch, and a potential of the positive-phase input terminal of the operational amplifier in a predetermined sequence, wherein the sequence control means carries out the steps of (1) switching ON the reset switch and the switching element, and supplying an identical potential with a potential of the detection object to the positive-phase input terminal of the operational amplifier and the auxiliary capacitor electrode while the reset switch and the switching element are ON, (2) switching OFF the reset switch, and supplying a different potential from the potential of the detection object in the step (1) to the positive-phase input terminal of the operational amplifier and the auxiliary capacitor electrode while the reset switch is OFF and the switching element is ON so as to charge the feedback condenser, (3) controlling the detecting circuit to detect electric charges as charged at the feedback condenser while the reset switch is OFF and the switching element is ON, and (4) switching OFF the switching element, wherein the sequence control means carries out said steps (1) through (4) in this order, and the capacitance formed between the detection object and each of the detecting electrodes according to the uneven pattern, is detected based on the electric charges detected in the step (3).

With this arrangement, the capacitance (target capacitance) is formed between the detection object and each of the detecting electrodes according to the uneven pattern. Then, the electric charges determined by the capacitance are charged to the feedback condenser and the charged electric charges are detected. Note that, during the sequence for detecting the capacitance, the switching element is held in the ON-state while the electric charges determined by the capacitance (target capacitance) is charged to the feedback condenser and detected by the detecting circuit. This does not change the charged electric charges at the parasitic capacitor of the detecting signal line, which is caused mainly by overlapping of the auxiliary capacitor and the drive signal line. Thus, the parasitic capacitor does not affect the detection of the electric charges.

An uneven pattern detecting device of the present invention may be arranged so as to include (a) the uneven pattern detector and (b) sequence control means for controlling the drive circuit, the detecting circuit, and the potential application means so as to change an ON/OFF state of the switching element, an ON/OFF state of the reset switch, and a potential of the detection object in a predetermined sequence, wherein the sequence control means carries out the steps of (1) switching ON the switching element, and supplying a first potential to the detection object while the switching element is ON, (2) (a) switching OFF the switching element and changing the potential supplied to the detection object from the first potential to a second potential while the switching element is OFF, and (b) switching ON and then OFF the reset switch, (3) switching ON the switching element while the reset switch is OFF so as to charge the feedback condenser, and (4) switching OFF the switching element, and controlling the detecting circuit to detect electric charges as charged at the feedback condenser while the reset switch and the switching element are OFF, wherein said sequence control means carries out said steps (1) through (4) in this order, while said steps (1) to (4) are being carried out, the positive-phase input terminal of the operational amplifier and the auxiliary capacitor electrode are fixed at the same potential, and the capacitance formed between the detection object and each of the detecting electrodes according to the uneven pattern, is detected based on the electric charges detected in the step (4).

With this arrangement, the electric charges determined by (a) the capacitance formed between the detection object and each of the detecting electrodes according to the uneven pattern, and (b) a potential difference between the first potential and the second potential are charged to the feedback condenser and the charged electric charges are detected. Further, when the uneven pattern on the identical detection object is successively detected plural times for accumulating the detected data, it is possible to successively detect the data without a reset process in which the electric charges charged at the target capacitance are discharged per each frame.

An detecting method of the present invention, for detecting an uneven pattern on a detection object by means of the uneven pattern detector, is arranged so as to have the steps of (1) switching ON the switching element, and supplying an identical potential with a potential of the detection object to the corresponding detecting signal line and the auxiliary capacitor electrode while the switching element is ON, (2) supplying a different potential from the potential of the detection object in the step (1) to the corresponding detecting signal line and the auxiliary capacitor electrode while the switching element is ON so as to charge the feedback condenser, (3) detecting electric charges transferred between the detecting circuit and the detecting electrode via the corresponding detecting signal line while the switching element is ON, and (4) switching OFF the switching element, wherein said steps (1) through (4) are carried out in this order, and a capacitance formed between the detection object and each of the detecting electrodes according to the uneven pattern, is detected based on the electric charges detected in the step (3).

With this method, the electric charges are determined by the capacitance (target capacitance) formed between the detection object and each of the detecting electrodes. Then, in a relatively simple driving method, the electric charges are transferred between the detecting electrode and the detecting circuit, and the transferred electric charges are detected. This means that the capacitance reflecting the uneven pattern on the detection object is detected.

A detecting method of the present invention, for detecting an uneven pattern on a detection object by means of the uneven pattern detector, is arranged so as to have the steps of (1) switching ON switching element, and supplying a first potential to the detection object while the switching element is ON, (2) switching OFF the switching element and changing the potential supplied to the detection object from the first potential to a second potential while the switching element is OFF, and (3) switching ON the switching element, and detecting electric charges transferred between the detecting circuit and the detecting electrode via the corresponding detecting signal line while the switching element is ON, wherein said steps (1) through (3) are carried out in this order, while said steps (1) through (3) are being carried out, the corresponding detecting signal line and the auxiliary capacitor electrode are fixed at the same potential, and a capacitance formed between the detection object and each of the detecting electrodes according to the uneven pattern, is detected based on the electric charges detected in the step (3).

With this method, the electric charges determined by (a) the target capacitance (the capacitance formed between the detection object and each of the detecting electrodes), and (b) the difference in the potential applied to the detection object (the potential difference between the first potential and the second potential) are detected. This detects the capacitance reflecting the uneven pattern on the detection object. Further, when the uneven pattern on the identical detection object is successively detected plural times for accumulating the detected data, it is possible to successively detect the data without a reset process in which the electric charges charged at the target capacitance are discharged per each frame.

The invention being thus described, it will be obvious that the same may be varied in many ways. Such variations are not to be regarded as a departure from the spirit and scope of the invention, and all such modifications as would be obvious to the one skilled in the art intended to be included within the scope of the following claims.

What is claimed is:

1. An uneven pattern detector for detecting an uneven pattern on a detection object placed on a detecting surface, comprising:
   a drive circuit;
   a detecting circuit;
   a plurality of drive signal lines connected to the drive circuit;
   a plurality of detecting signal lines connected to the detecting circuit, arranged so as to cross the plurality of drive signal lines respectively; and
   a plurality of detecting elements respectively corresponding to intersections of the plurality of drive signal lines and the plurality of detecting signal lines,
   wherein each of the respective detecting elements includes:
      a switching element switched ON and OFF respectively in response to an active signal and a non-active signal applied to a corresponding drive signal line which is a drive signal line passing through a corresponding intersection,
      a detecting electrode connected via the switching element to a corresponding detecting signal line which is a detecting signal line passing through a corresponding intersection, and an auxiliary capacitor electrode provided so as to form a predetermined capacitance with the detecting electrode;

wherein the drive circuit applies the active signal and the non-active signal to the corresponding drive signal line so as to switch the switching element ON and OFF; and the detecting circuit supplies a predetermined potential to the corresponding detecting signal line, and detects a resulting capacitance formed between the detection object and each of the detecting electrodes according to the uneven pattern, based on electric charges transferred between the detecting circuit and each of the detecting electrodes via the corresponding detecting signal line and the switching element.

2. The uneven pattern detector as set forth in claim 1, wherein:

the detecting electrode includes (a) an electrode for the detection object, which forms the capacitance with the detection object, and (b) an electrode for the auxiliary capacitor electrode, which forms the capacitance with the auxiliary capacitor electrode, (a) said electrode for the detection object and (b) said electrode for the auxiliary capacitor electrode being electrically connected.

3. The uneven pattern detector as set forth in claim 1, wherein:

the switching element is a Thin Film Transistor (TFT).

4. The uneven pattern detector as set forth in claim 1, wherein:

the plurality of detecting elements are coated with an insulating layer so as to form the detecting surface.

5. The uneven pattern detector as set forth in claim 4, wherein:

the insulation layer is composed of one of materials including tantalum pentoxide, silicone nitride, silicone oxide, acrylic resin and polyimide resin.

6. The uneven pattern detector as set forth in claim 1, further comprising:

potential application means for applying a predetermined potential to the detection object placed on the detecting surface.

7. The uneven pattern detector as set forth in claim 1, wherein:

the auxiliary capacitor electrode is provided on an opposite side of the detecting surface with respect to the detecting electrode, and is formed so as to cover almost an entire surface of the detecting electrode.

8. The uneven pattern detector as set forth in claim 1, wherein:

the corresponding detecting signal line and the auxiliary capacitor electrode are maintained at the same potential.

9. The uneven pattern detector as set forth in claim 8, wherein the detecting circuit includes electric charge detecting means connected to the corresponding detecting signal line, the electric charge detecting means including:

an operational amplifier having a negative-phase input terminal connected to the corresponding detecting signal line;

a feedback condenser in which one end is connected to the negative-phase input terminal and an other end is connected to an output terminal of the operational amplifier; and a reset switch connected in parallel to the feedback condenser, for switching between the both ends of the feedback condenser, wherein the positive-phase input terminal of the operation amplifier and the auxiliary capacitor electrode are held at the same potential so as to maintain the corresponding detecting signal line and the auxiliary capacitor electrode at the same potential.

10. The uneven pattern detector as set forth in claim 9, wherein:

the auxiliary capacitor electrode includes a wiring electrode for connecting another auxiliary capacitor electrode adjacently located in a direction of the drive signal line.

11. The uneven pattern detector as set forth in claim 10, wherein the detecting circuit further includes:

a detected data storing circuit for storing the detected capacitance as detected data and for outputting the detected data to an outside exterior.

12. The uneven pattern detector as set forth in claim 11, wherein:

the detected data storing circuit outputs the detected data corresponding to the drive signal line, line by line.

13. The uneven pattern detector as set forth in claim 9, wherein:

the positive-phase input terminal of the operational amplifier is connected to the auxiliary capacitor electrode.

14. The uneven pattern detector as set forth in claim 9, further comprising:

potential application means for applying a predetermined potential to the detection object placed on the detecting surface.

15. An uneven pattern detecting device, comprising:

a drive circuit;

a detecting circuit;

a plurality of drive signal lines connected to the drive circuit;

a plurality of detecting signal lines connected to the detecting circuit, arranged so as to cross the plurality of drive signal lines respectively; and a plurality of detecting elements respectively corresponding to intersections of the plurality of drive signal lines and the plurality of detecting signal lines, wherein:

each of the respective detecting elements includes:

a switching element switched ON and OFF respectively in response to an active signal and a non-active signal applied to a corresponding drive signal line which is a drive signal line passing through a corresponding intersection, a detecting electrode connected via the switching element to a corresponding detecting signal line which is a detecting signal line passing through a corresponding intersection, and an auxiliary capacitor electrode provided so as to form a predetermined capacitance with the detecting electrode;

the drive circuit applies the active signal and the non-active signal to the corresponding drive signal line so as to switch the switching element ON and OFF;

the detecting circuit includes electric charge detecting means connected to the corresponding detecting signal line, the electric charge detecting means including:

an operational amplifier having a negative-phase input terminal connected to the corresponding detecting signal line, a feedback condenser in which one end is connected to the negative-phase input terminal and an other end is connected to an output terminal of the operational amplifier, and a reset switch connected in parallel to the feedback condenser, for switching between the both ends of the feedback condenser;

the uneven pattern detecting device further comprising:

an uneven pattern detector (a) for holding the positive-phase input terminal of the operation amplifier and the auxiliary capacitor electrode at the same potential so as to maintain the corresponding detecting signal line and the auxiliary capacitor electrode at the same potential and (b) for supplying a predetermined potential to the corresponding detecting signal line, and detecting a resulting capacitance, which is formed between a detection object and each of the detecting electrodes according to the uneven pattern, based on electric charges transferred between the detecting circuit and each of the detecting electrodes via the corresponding detecting signal line and the switching element; and sequence control means for controlling the drive circuit and the detecting circuit so as to change an ON/OFF state of the switching element, an ON/OFF state of the reset switch, and a potential of the positive-phase input terminal of the operational amplifier in a predetermined sequence, wherein the sequence control means carries out the steps of:

(1) switching ON the reset switch and the switching element, and supplying an identical potential with a potential of the detection object to the positive-phase input terminal of the operational amplifier and the auxiliary capacitor electrode while the reset switch and the switching element are ON, (2) switching OFF the switching element, and supplying a different potential from the potential of the detection object to the positive-phase input terminal of the operational amplifier and the auxiliary capacitor electrode while the reset switch is ON and the switching element is OFF, (3) switching OFF the reset switch, and switching ON the switching element so as to charge the feedback condenser while the reset switch is OFF, and (4) switching OFF the switching element, and controlling the detecting circuit to detect electric charges as charged at the feedback condenser while the reset switch and the switching element are OFF, wherein the sequence control means carries out said steps (1) through (4) in this order, and the capacitance formed between a detection object and each of the detecting electrodes according to the uneven pattern, is detected based on the electric charges detected in the step (4).

16. The uneven pattern detecting device as set forth in claim 15, wherein the detecting circuit further includes:

a detected data storing circuit for storing the detected capacitance as detected data, and for sequentially outputting the detected data to the sequence control means, wherein the sequence control means sequentially stores the detected data outputted from the detected data storing circuit, and obtains detected data of a whole detection object.

17. An uneven pattern detecting device, comprising:

a drive circuit;

a detecting circuit;

a plurality of drive signal lines connected to the drive circuit;

a plurality of detecting signal lines connected to the detecting circuit, arranged so as to cross the plurality of drive signal lines respectively; and a plurality of detecting elements respectively corresponding to intersections of the plurality of drive signal lines and the plurality of detecting signal lines, wherein:

each of the respective detecting elements includes:

a switching element switched ON and OFF respectively in response to an active signal and a non-active signal applied to a corresponding drive signal line which is a drive signal line passing through a corresponding intersection, a detecting electrode connected via the switching element to a corresponding detecting signal line which is a detecting signal line passing through a corresponding intersection, and an auxiliary capacitor electrode provided so as to form a predetermined capacitance with the detecting electrode;

the drive circuit applies the active signal and the non-active signal to the corresponding drive signal line so as to switch the switching element ON and OFF;

the detecting circuit includes electric charge detecting means connected to the corresponding detecting signal line, the electric charge detecting means including:

an operational amplifier having a negative-phase input terminal connected to the corresponding detecting signal line, a feedback condenser in which one end is connected to the negative-phase input terminal and an other end is connected to an output terminal of the operational amplifier, and a reset switch connected in parallel to the feedback condenser, for switching between the both ends of the feedback condenser;

the uneven pattern detecting device further comprising:

an uneven pattern detector (a) for holding the positive-phase input terminal of the operation amplifier and the auxiliary capacitor electrode at the same potential so as to maintain the corresponding detecting signal line and the auxiliary capacitor electrode at the same potential and (b) for supplying a predetermined potential to the corresponding detecting signal line, and detecting a resulting capacitance, which is formed between a detection object and each of the detecting electrodes according to the uneven pattern, based on electric charges transferred between the detecting circuit and each of the detecting electrodes via the corresponding detecting signal line and the switching element; and sequence control means for controlling the drive circuit and the detecting circuit so as to change an ON/OFF state of the switching element, an ON/OFF state of the reset switch, and a potential of the positive-phase input terminal of the operational amplifier in a predetermined sequence, wherein the sequence control means carries out the steps of:
(1) switching ON the reset switch and the switching element, and supplying an identical potential with a potential of the detection object to the positive-phase input terminal of the operational amplifier and the auxiliary capacitor electrode while the reset switch and the switching element are ON,
(2) switching OFF the reset switch, and supplying a different potential from the potential of the detection object in the step (1) to the positive-phase input terminal of the operational amplifier and the auxiliary capacitor electrode while the reset switch is OFF and the switching element is ON so as to charge the feedback condenser,
(3) controlling the detecting circuit to detect electric charges as charged at the feedback condenser while the reset switch is OFF and the switching element is ON, and
(4) switching OFF the switching element,
wherein the sequence control means carries out said steps (1) through (4) in this order, and
the capacitance formed between a detection object and each of the detecting electrodes according to the uneven pattern, is detected based on the electric charges as detected in the step (3).

18. The uneven pattern detecting device as set forth in claim 17, wherein the detecting circuit further includes:
a detected data storing circuit for storing the detected capacitance as detected data, and for sequentially outputting the detected data to the sequence control means,
wherein the sequence control means sequentially stores the detected data outputted from the detected data storing circuit, and obtains detected data of a whole detection object.

19. An uneven pattern detecting device, comprising:
a drive circuit;
a detecting circuit;
a plurality of drive signal lines connected to the drive circuit;
a plurality of detecting signal lines connected to the detecting circuit, arranged so as to cross the plurality of drive signal lines respectively;
a plurality of detecting elements respectively corresponding to intersections of the plurality of drive signal lines and the plurality of detecting signal lines; and
potential application means for supplying a predetermined potential to a detection object placed on a detecting surface, wherein:
each of the respective detecting elements includes:
a switching element switched ON and OFF respectively in response to an active signal and a non-active signal applied to a corresponding drive signal line which is a drive signal line passing through a corresponding intersection,
a detecting electrode connected via the switching element to a corresponding detecting signal line which is a detecting signal line passing through a corresponding intersection, and
an auxiliary capacitor electrode provided so as to form a predetermined capacitance with the detecting electrode;
the drive circuit applies the active signal and the non-active signal to the corresponding drive signal line so as to switch the switching element ON and OFF;
the detecting circuit includes electric charge detecting means connected to the corresponding detecting signal line, the electric charge detecting means including:
an operational amplifier having a negative-phase input terminal connected to the corresponding detecting signal line,
a feedback condenser in which one end is connected to the negative-phase input terminal and an other end is connected to an output terminal of the operational amplifier, and
a reset switch connected in parallel to the feedback condenser, for switching between the both ends of the feedback condenser;
the uneven pattern detecting device further comprising:
an uneven pattern detector (a) for holding the positive-phase input terminal of the operation amplifier and the auxiliary capacitor electrode at the same potential so as to maintain the corresponding detecting signal line and the auxiliary capacitor electrode at the same potential and (b) for supplying a predetermined potential to the corresponding detecting signal line, and detecting a resulting capacitance, which is formed between the detection object and each of the detecting electrodes according to the uneven pattern, based on electric charges transferred between the detecting circuit and each of the detecting electrodes via the corresponding detecting signal line and the switching element; and
sequence control means for controlling the drive circuit, the detecting circuit, and the potential application means so as to change an ON/OFF state of the switching element, an ON/OFF state of the reset switch, and a potential of the detection object in a predetermined sequence,
wherein the sequence control means carries out the steps of:
(1) switching ON the switching element, and supplying a first potential to the detection object while the switching element is ON,
(2) (a) switching OFF the switching element and changing the potential supplied to the detection object from the first potential to a second potential while the switching element is OFF, and (b) switching ON and then OFF the reset switch,
(3) switching ON the switching element while the reset switch is OFF so as to charge the feedback condenser, and
(4) switching OFF the switching element, and controlling the detecting circuit to detect electric charges as charged at the feedback condenser while the reset switch and the switching element are OFF,
wherein the sequence control means carries out said steps (1) through (4) in this order,
while said steps (1) to (4) are being carried out, the positive-phase input terminal of the operational amplifier and the auxiliary capacitor electrode are fixed at the same potential, and
the capacitance formed between the detection object and each of the detecting electrodes according to the uneven pattern, is detected based on the electric charges detected in the step (4).

20. The uneven pattern detecting device as set forth in claim 19, wherein the detecting circuit further includes:

a detected data storing circuit for storing the detected capacitance as detected data, and for sequentially outputting the detected data to the sequence control means, wherein the sequence control means sequentially stores the detected data outputted from the detected data storing circuit, and obtains detected data of a whole detection object.

21. A detecting method for detecting an uneven pattern on a detection object placed on a detecting surface, by means of an uneven pattern detector which includes:

a drive circuit;

a detecting circuit;

a plurality of drive signal lines connected to the drive circuit;

a plurality of detecting signal lines connected to the detecting circuit, arranged so as to cross the plurality of drive signal lines respectively; and a plurality of detecting elements respectively corresponding to intersections of the plurality of drive signal lines and the plurality of detecting signal lines, wherein each of the respective detecting elements includes:

a switching element switched ON and OFF respectively in response to an active signal and a non-active signal applied to a corresponding drive signal line which is a drive signal line passing through a corresponding intersection;

a detecting electrode connected via the switching element to a corresponding detecting signal line which is a detecting signal line passing through a corresponding intersection; and an auxiliary capacitor electrode provided so as to form a predetermined capacitance with the detecting electrode;

wherein the detecting method comprising the steps of:
(1) switching ON the switching element, and supplying an identical potential with a potential of the detection object to the corresponding detecting signal line and the auxiliary capacitor electrode while the switching element is ON;
(2) switching OFF the switching element, and supplying a different potential from the potential of the detection object to the corresponding detecting signal line and the auxiliary capacitor electrode while the switching element is OFF; and
(3) switching ON the switching element, and detecting electric charges transferred between the detecting circuit and the detecting electrode via the corresponding detecting signal line while the switching element is ON, wherein said steps (1) through (3) are carried out in this order, and a capacitance formed between the detection object and each of the detecting electrodes according to the uneven pattern, is detected based on the electric charges detected in the step (3).

22. A detecting method for detecting an uneven pattern on a detection object placed on a detecting surface, by means of an uneven pattern detector which includes:

a drive circuit;

a detecting circuit;

a plurality of drive signal lines connected to the drive circuit;

a plurality of detecting signal lines connected to the detecting circuit, arranged so as to cross the plurality of drive signal lines respectively; and a plurality of detecting elements respectively corresponding to intersections of the plurality of drive signal lines and the plurality of detecting signal lines, wherein each of the respective detecting elements includes:

a switching element switched ON and OFF respectively in response to an active signal and a non-active signal applied to a corresponding drive signal line which is a drive signal line passing through a corresponding intersection;

a detecting electrode connected via the switching element to a corresponding detecting signal line which is a detecting signal line passing through a corresponding intersection; and an auxiliary capacitor electrode provided so as to form a predetermined capacitance with the detecting electrode;

wherein the detecting method comprising the steps of:
(1) switching ON the switching element, and supplying an identical potential with a potential of the detection object to the corresponding detecting signal line and the auxiliary capacitor electrode while the switching element is ON;
(2) supplying a different potential from the potential of the detection object in the step (1) to the corresponding detecting signal line and the auxiliary capacitor electrode while the switching element is ON;
(3) detecting electric charges transferred between the detecting circuit and the detecting electrode via the corresponding detecting signal line while the switching element is ON; and
(4) switching OFF the switching element, wherein said steps (1) through (3) are carried out in this order, and a capacitance formed between the detection object and each of the detecting electrodes according to the uneven pattern, is detected based on the electric charges detected in the step (3).

23. A detecting method for detecting an uneven pattern on a detection object placed on a detecting surface, by means of an uneven pattern detector which includes:

a drive circuit;

a detecting circuit;

a plurality of drive signal lines connected to the drive circuit;

a plurality of detecting signal lines connected to the detecting circuit, arranged so as to cross the plurality of drive signal lines respectively;

a plurality of detecting elements respectively corresponding to intersections of the plurality of drive signal lines and the plurality of detecting signal lines; and potential application means for supplying a predetermined potential to the detection object placed on the detecting surface, wherein each of the respective detecting elements includes:

a switching element switched ON and OFF respectively in response to an active signal and a non-active signal applied to a corresponding drive signal line which is a drive signal line passing through a corresponding intersection;

a detecting electrode connected via the switching element to a corresponding detecting signal line which is a detecting signal line passing through a corresponding intersection; and an auxiliary capacitor electrode provided so as to form a predetermined capacitance with the detecting electrode;

wherein the detecting method comprising the steps of:
(1) switching ON the switching element, and supplying a first potential to the detection object while the switching element is ON;
(2) switching OFF the switching element and changing the potential supplied to the detection object from the first potential to a second potential while the switching element is OFF; and
(3) switching ON the switching element, and detecting electric charges transferred between the detecting circuit and the detecting electrode via the corresponding detecting signal line while the switching element is ON, wherein said steps (1) through (3) are carried out in this order, while said steps (1) through (3) are being carried out, the corresponding detecting signal line and the auxiliary capacitor electrode are fixed at the same potential, and a capacitance formed between the detection object and each of the detecting electrodes according to the uneven pattern, is detected based on the electric charges detected in the step (3).

* * * * *